(12) United States Patent
Sugiyama et al.

(10) Patent No.: US 6,339,746 B1
(45) Date of Patent: Jan. 15, 2002

(54) ROUTE GUIDANCE SYSTEM AND METHOD FOR A PEDESTRIAN

(75) Inventors: Hiroshi Sugiyama, Kanagawa-ken; Tamotsu Hasegawa, Tokyo; Miwako Doi, Kanagawa-ken, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/651,095

(22) Filed: Aug. 30, 2000

(30) Foreign Application Priority Data

Sep. 30, 1999 (JP) .......................................... 11-280051
Jun. 8, 2000 (JP) .......................................... 12-172626

(51) Int. Cl.$^7$ ............................ G01C 2/00; G01S 11/00; G06F 3/00; G06F 7/00; G06F 9/00; G06F 12/00; G06F 13/00; G06F 15/00; G06F 17/00; G06F 19/00; G06F 163/00

(52) U.S. Cl. .............................. 701/209; 701/200–208; 701/209–215; 701/23–26; 340/323 R; 340/988; 340/989; 340/991; 340/993; 340/990; 340/995; 340/996; 342/456; 342/457; 342/450; 342/451; 342/357.1; 342/357.06; 342/357.13

(58) Field of Search ............................... 701/200–215, 701/23–26; 340/990, 991, 995, 996, 989, 988, 993, 323 R; 342/456, 457, 451, 450, 357.1, 357.06, 357.13

(56) References Cited

U.S. PATENT DOCUMENTS

| | | | | |
|---|---|---|---|---|
| 5,470,233 A | | 11/1995 | Fruchterman et al. | 434/112 |
| 5,625,668 A | * | 4/1997 | Loomis et al. | 37/58 |
| 5,646,857 A | * | 7/1997 | McBurney et al. | 364/449.7 |
| 5,672,840 A | * | 9/1997 | Sage et al. | 89/41.01 |
| 5,685,786 A | * | 11/1997 | Dudley | 473/407 |
| 5,848,373 A | * | 12/1998 | DeLorme et al. | 701/200 |
| 5,948,040 A | * | 9/1999 | DeLorme et al. | 701/201 |
| 6,023,241 A | * | 2/2000 | Clapper | 342/357.13 |
| 6,055,478 A | * | 4/2000 | Heron | 701/213 |
| 6,064,942 A | * | 5/2000 | Johnson et al. | 701/213 |
| 6,076,039 A | * | 6/2000 | Kabel et al. | 701/206 |
| 6,128,571 A | * | 10/2000 | Ito et al. | 701/201 |
| 6,182,010 B1 | * | 1/2001 | Berstis | 701/211 |
| 6,184,823 B1 | * | 2/2001 | Smith et al. | 342/357.13 |

FOREIGN PATENT DOCUMENTS

| | | |
|---|---|---|
| JP | 10-122884 | 5/1998 |
| JP | 10-319839 | 12/1998 |

OTHER PUBLICATIONS

Fujii et al.; "A Method of Generating a Spot–Guidance for Human Navigation", IEICE vol. J82–D–II No. 11, pp. 2026–2034, Nov., 1999.

* cited by examiner

Primary Examiner—William A. Cuchlinski, Jr.
Assistant Examiner—Ronnie Mancho
(74) Attorney, Agent, or Firm—Finnegan, Henderson, Farabow, Garrett & Dunner, L.L.P.

(57) ABSTRACT

A route guidance system for a pedestrian. An input unit inputs a departure point and a destination point of the pedestrian. A route data memory stores route data representing position and connection of each route comprising a road network. A route calculation unit calculates a route from the departure point to the destination point by referring to the route data in said route data memory. A landmark memory stores landmark data for the pedestrian's confirmation; a landmark represents a signpost of the departure point, the destination point, and the route. A landmark selection unit selects the landmark data corresponding to the route calculated by said route calculation unit from said landmark memory. A presentation unit presents a route guidance to the pedestrian using the calculated route and the selected landmark data.

29 Claims, 33 Drawing Sheets

FIG. 4

INPUT A DEPARTURE PLACE AND A DESTINATION OF ROUTE GUIDANCE

DEPARTURE PLACE

STATION NAME, LANDMARK NAME

ADDRESS

DESTINATION

STATION NAME, LANDMARK NAME

ADDRESS

FIG. 5A

| LANDMARK ID | NAME | CLASS | POSITION |
|---|---|---|---|
| 1 | A ELEVEN | CONVENIENCE STORE | (X1, Y1) |
| 2 | B BANK | BANK | (X2, Y2) |
| 3 | C BOOKSTORE | BOOKSTORE | (X3, Y3) |
| 4 | D CUISINE | RESTAURANT | (X4, Y4) |
| 5 | E INTERSECTION | INTERSECTION (WITH TRAFFIC SIGNAL) | (X5, Y5) |
| • • | | | |

FIG. 5B

| CLASS | PEDESTRIAN APTITUDE |
|---|---|
| CONVENIENCE STORE | 5 |
| BANK | 4 |
| RESTAURANT | 5 |
| BOOKSTORE | 3 |
| GENERAL SHOP | 3 |
| SCHOOL | 1 |
| FACTORY | 1 |
| • • | |

FIG. 9

INPUT A DEPARTURE PLACE AND A DESTINATION OF ROUTE GUIDANCE

DEPARTURE PLACE

STATION NAME, LANDMARK NAME ▭
ADDRESS ▭

DESTINATION

STATION NAME, LANDMARK NAME ▭
ADDRESS ▭

TIME

[14 ▼] HOUR [20 ▼] MINUTE

FIG. 10A

| LANDMARK ID | NAME | CLASS | APTITUDE TIME | POSITION |
|---|---|---|---|---|
| 1 | A ELEVEN | CONVENIENCE STORE | | (X1, Y1) |
| 2 | B BANK | BANK | | (X2, Y2) |
| 3 | C BOOKSTORE | BOOKSTORE | 10 ~ 19 | (X3, Y3) |
| 4 | D CUISINE | RESTAURANT | 17 ~ 23 | (X4, Y4) |
| 5 | E INTERSECTION | INTERSECTION (WITH TRAFFIC SIGNAL) | 0 ~ 24 | (X5, Y5) |
| · · | | | | |

FIG. 10B

| CLASS | APTITUDE TIME | PEDESTRIAN APTITUDE |
|---|---|---|
| CONVENIENCE STORE | 0 ~ 24 | 5 |
| BANK | 0 ~ 24 | 4 |
| RESTAURANT | 11 ~ 24 | 5 |
| BOOKSTORE | 10 ~ 19 | 3 |
| GENERAL SHOP | 10 ~ 19 | 3 |
| SCHOOL | 8 ~ 17 | 1 |
| FACTORY | 8 ~ 17 | 1 |
| · · | | |

FIG. 11

| SYSTEM | USER |
|---|---|
| THERE IS B BANK FORWARD AS 30 METERS. | YES. |
| PLEASE GO AHEAD TO THE INTERSECTION WHERE B BANK IS LOCATED. | YES. |
| PLEASE TURN TO THE LEFT. | YES. |
| IF YOU GO AHEAD AS 100 METERS, THERE IS A FACTORY AT LEFT SIDE. | YES. |
| PLEASE GO AHEAD TO E INTERSECTION FORWARD AS 50 METERS. | I AM NOT SURE. |
| IS THERE A BOOKSTORE AT THIS RIGHT SIDE OF THE INTERSECTION? | YES. |
| IS THAT C BOOKSTORE? | YES. |
| PLEASE TURN TO THE RIGHT AT THIS INTERSECTION. | YES. |
| YOUR DESTINATION IS LOCATED AT RIGHT SIDE FORWARD AS 50 METERS. | |

FIG. 14

| | | ACCURACY OF POSITION CONFIRMATION | |
| --- | --- | --- | --- |
| | | HIGH | LOW |
| ACCURACY OF POSITION ACQUISITION | LOW | • HIGH FREQUENCY OF CONFIRMATION (INTERVAL DISTANCE OF CONFIRMATION ---30m)<br>• DECISION MODE | • HIGH FREQUENCY OF CONFIRMATION (INTERVAL DISTANCE OF CONFIRMATION ---30m)<br>• CONFIRMATION MODE |
| | HIGH | • LOW FREQUENCY OF CONFIRMATION (INTERVAL DISTANCE OF CONFIRMATION ---100m)<br>• DECISION MODE | • LOW FREQUENCY OF CONFIRMATION (INTERVAL DISTANCE OF CONFIRMATION ---100m)<br>• CONFIRMATION MODE |

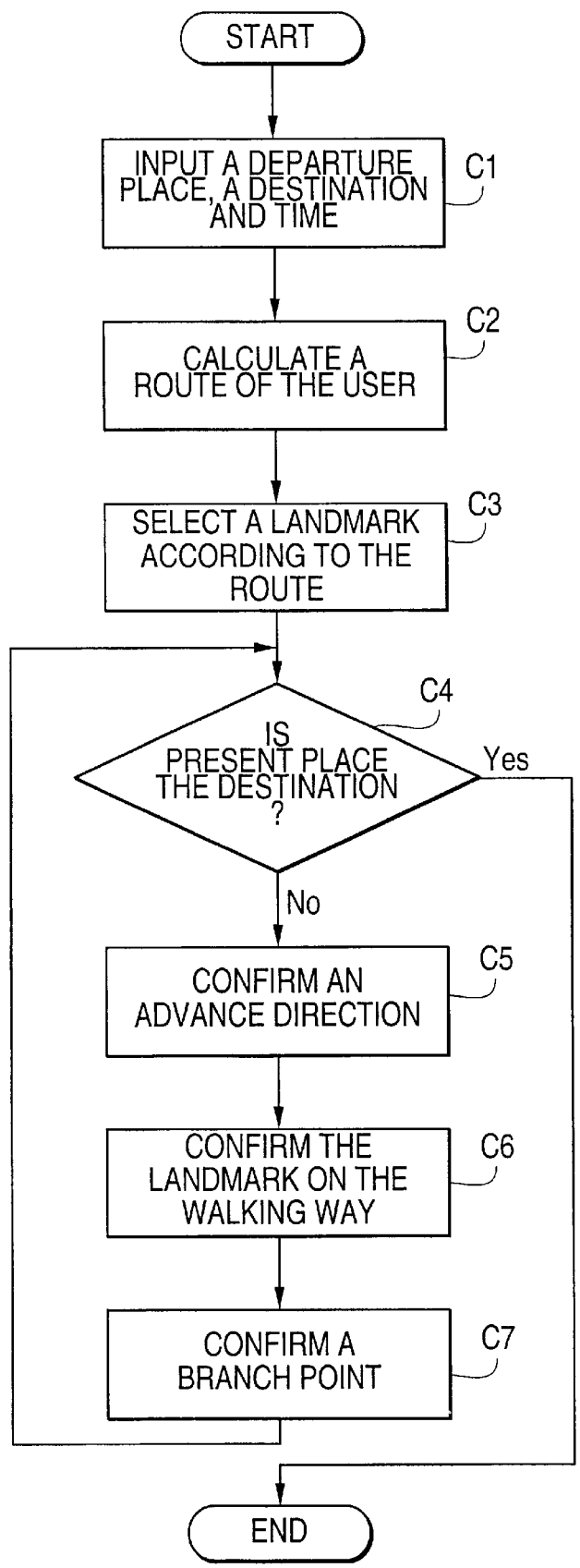

FIG. 18A

| LANDMARK ID | NAME | CLASS | NUMBER OF STAIRS | APTITUDE TIME | VIEWABLE DISTANCE (DAYTIME, NIGHTTIME) | POSITION |
|---|---|---|---|---|---|---|
| 1 | A ELEVEN | CONVENIENCE STORE | 1 | | 40m, 40m | (X1, Y1) |
| 2 | B BANK | BANK | 4 | | 50m, 40m | (X2, Y2) |
| 3 | C BOOKSTORE | BOOKSTORE | 2 | 10~19 | 30m, 20m | (X3, Y3) |
| 4 | D CUISINE | RESTAURANT | 7 | | 20m, 0m | (X4, Y4) |
| 5 | E INTERSECTION | INTERSECTION (WITH TRAFFIC SIGNAL) | 0 | 0~24 | | (X5, Y5) |
| ⋮ | | | | | | |

FIG. 18B

| CLASS | APTITUDE TIME | VIEWABLE DISTANCE (DAYTIME, NIGHTTIME) | PEDESTRIAN APTITUDE |
|---|---|---|---|
| CONVENIENCE STORE | 0~24 | 40m, 40m | 5 |
| BANK | 0~24 | 50m, 50m | 4 |
| RESTAURANT | 11~24 | 50m, 100m | 5 |
| BOOKSTORE | 10~19 | 20m, 10m | 3 |
| GENERAL SHOP | 10~19 | 20m, 10m | 3 |
| SCHOOL | 8~17 | 30m, 10m | 1 |
| FACTORY | 8~17 | 100m, 130m | 1 |
| ⋮ | | | |

FIG. 24A

| LANDMARK ID | NAME | CLASS | NUMBER OF STAIRS | APTITUDE TIME | VIEWABLE DISTANCE | POSITION |
|---|---|---|---|---|---|---|
| 1 | A ELEVEN | CONVENIENCE STORE | 1 | | 40m | (X1, Y1) |
| 2 | B BANK | BANK | 4 | | 50m | (X2, Y2) |
| 3 | C BOOKSTORE | BOOKSTORE | 2 | 10~19 | 20m | (X3, Y3) |
| 4 | MAISON G | CONDOMINIUM | 7 | | 20m | (X4, Y4) |
| 5 | E INTERSECTION | INTERSECTION (WITH TRAFFIC SIGNAL) | 0 | 0~24 | 100m | (X5, Y5) |
| ⋮ | | | | | | |

FIG. 24B

| LANDMARK ID | LANDMARK ROUTE ID | CONFIRMATION BRANCH POINT ID | DATA TIME | CONFIRMATION LEVEL |
|---|---|---|---|---|
| 4 | 11 | 8 | 13 | NAME |
| 4 | 16 | 45 | 20 | NUMBER OF STORIES |
| 4 | 16 | 45 | 13 | NUMBER OF STORIES |
| 4 | 11 | 9 | 10 | NAME |
| 5 | 12 | 7 | 13 | NAME |

FIG. 32

| SYSTEM | USER |
|---|---|
| IS THERE A CONVENIENCE STORE, A BANK, OR A LAUNDRY NEIGHBORING YOU? | |
| | LAUNDRY. |
| IT IS THE LAUNDRY, ISN'T IT? | |
| | YES. |
| WHAT IS THE LAUNDRIE'S NAME? | |
| | ABC LAUNDRY. |
| IT IS ABC LAUNDRY, ISN'T IT? | |
| | YES. |
| PLEASE MOVE IN FRONT OF ABC LAUNDRY. | |
| | YES. |
| PLEASE GO TO ABC SUPERMARKET FORWARD AS 30 METERS. | |
| | YES. |

IS THE FOLLOWING STORE NEIGHBORING YOU?

1. CONVENIENCE STORE

2. BANK

3. LAUNDRY

ROUTE GUIDANCE SYSTEM AND METHOD FOR A PEDESTRIAN

FIELD OF THE INVENTION

The present invention relates to a route guidance system and a method for effectively guiding a pedestrian from a departure place to a destination along a route.

BACKGROUND OF THE INVENTION

Recently, a route guidance system to guide a user from a departure point to a destination is variously developed. In general, a car navigation system is used as the route guidance system. On the other hand, only a few route guidance systems for the pedestrian exist manufactured as some products. A first product is a GPS (Grobal Positioning system) receiver in a portable terminal. The GPS receiver does not display a map and includes only the function to display a latitude and a longitude of the present position of the user and a distance and a direction to a registered landmark. Furthermore, in proportion to small sized GPS receiver, a product loaded in a wristwatch appears. However, these products are only used for the route guidance in fields and mountains and not used for the route guidance in town.

A second product is a portable terminal to display a map and town information retrieved from a CD-ROM or the Internet by calculating the user's present location using GPS local positioning service of a cellular phone. The portable terminal is very convenient for the user to confirm the present position on the map and to check for neighboring store information. On the Internet, a service to retrieve town information and to display a route guidance map with the store information is widely used. Normally, it may be printed out before the user's walk. If the user brings this portable terminal, he can utilize a service related to a place at any time and anywhere by easy operation. In this service now, the map and the address of store are only displayed. If the user's course is indicated in the same way as the car navigation system, it is more convenient for the user. However, in the existing system, the user walks by deciding the route by himself while watching the displayed map. It is not utilized for the user's walk while the course is indicated to the user in the same way as the car navigation system. Furthermore, walking while watching the map is dangerous. If possible, it is desired that the course is indicated by speech while the user is walking. Furthermore, in order to guide the route by indicating the course such as the car navigation system, a present location of the user is correctly acquired, and a suitable indication is executed at a timing when the user approaches a change point of the course. In case of the car navigation system, it is a prerequisite that a vehicle runs at one side of the road (left in Japan and right in the United States, for example). Accordingly, a relatively correct value is obtained from not only a GPS but also from various kinds of sensor means for correction such as a range finder or an acceleration sensor. Furthermore, because a position correction means using FM or beacon is arranged as infrastructure, a location of the particular vehicle is correctly specified.

On the contrary, in case of a pedestrian, the pedestrian walks on a sidewalk at an edge of the road. Accordingly, an electric wave of GPS is hard to be received in town and there are a few places to use GPS. Furthermore, an antenna of GPS is not fixed. In short, the antenna is not horizontally kept and the receiving accuracy is not stable. The position acquisition means by PHS also includes error such as 30~100 m, and a position error of one or two streets in a town possibly occurs. The speed of a pedestrian is low, and his view from the sidewalk is narrow. The scale of this error thus greatly impacts the pedestrian. As a result, it is difficult for the position of the pedestrian to be continually obtained accurately in the same way as in car navigation. For example, an indication such as "Please turn at the next intersection." is not executed at the correct location and timing. Accordingly, a route guidance method different from the car navigation system is necessary for the route guidance system for a pedestrian.

When driving a vehicle, a point to change the course is an intersection of the road, and the indication is executed by a name of the intersection and a representation such as "next intersection". On the contrary, while walking, a signpost to specify the place is mainly a landmark such as a building. While the indication "Turn to the right side at A intersection" is presented to a driver in the car, the indication "Turn to the right side at an intersection with B bank located at a corner" is presented to the pedestrian. In the route guidance for the pedestrian, indication of the course by effectively using landmarks is very important.

As a landmark to guide the pedestrian, the object located at position easily viewable from the side walk at the edge of the road and apparently discriminated by the pedestrian is desired. However, the easy viewable object is varied by the environment and an outlook of the landmark itself. In case of selecting the landmark, its situation is taken into consideration. For example, a scenery of the same place varies at daytime and nighttime. Though a user can go the place at daytime, he often loses his way when he goes to the same place at nighttime, because the signpost is different at daytime and nighttime. For example, if a flower shop and a bar are located at same intersection, a colorful flower in the flower shop is conspicuous at daytime and a neon light of the bar is conspicuous at nighttime. Furthermore, a distance to confirm the landmark by eyesight is different by location of the landmark and time. Selection of the landmark to be confirmed from some point and timing to indicate the next landmark during walking is necessary to be controlled based on the distance from which each landmark is viewable.

On the other hand, frequent confirmation of the landmark often increases the user's burden. For example, in case that a receiving condition of GPS is fine and the position is correctly obtained, the control to reduce the confirmation such as "the confirmation is only executed front and rear the intersection to change the course." is necessary. Reversely, in case that the receiving condition of GPS is not fine, the route guidance that the location is corrected by frequent confirmation is necessary.

A known system can display a present location obtained by GPS on a map. This small-sized system that is the same as prior car navigation system and is portable. Accordingly, the above-mentioned problem, peculiar to the pedestrian, is not taken into consideration. For example, function such as how to select the landmark confirmable by the pedestrian, how to confirm the landmark, how to determine a timing to confirm the landmark, and how to indicate the course, are not provided.

As mentioned-above, in the route guidance for a pedestrian, the landmark is necessary as information to confirm the place and it is important to present landmarks confirmable by a pedestrian. Furthermore, the landmark confirmable by a pedestrian varies by the time. Accordingly, it is necessary that the landmark confirmable by a pedestrian while walking is indicated. Furthermore, from the pedestrian's location on the edge of a road, GPS is not easily utilized, and the location is not correctly obtained.

Accordingly, in order to execute the route guidance by indicating the course to the user, correction of the location of the user is continually necessary by the user's confirmation for the landmark.

SUMMARY OF THE INVENTION

It is an object of the present invention to provide a route guidance system and a method for a pedestrian to select a landmark adaptable to the walking environment and confirmable from the pedestrian by a many landmarks on the route, and to effectively present the landmark to the pedestrian.

According to the present invention, there is provided a route guidance system for a pedestrian, comprising: an input unit configured to input a departure place and a destination of the pedestrian as a user; a route data memory configured to storing route data representing position and connection of each route consisting of a road network; a route calculation unit configured to calculate a route from the departure place to the destination by referring to the route data in said route data memory; a landmark memory configured to storing landmark data for the pedestrian's confirmation, a landmark representing a signpost of the departure place, the destination, and the route; a landmark selection unit configured to select the landmark data corresponding to the route calculated by said route calculation unit from said landmark memory; and a presentation unit configured to present a route guidance for the pedestrian by using the route calculated by said route calculation unit and the landmark data selected by said landmark selection unit.

Further in accordance with the present invention, there is also provided a route guidance system for a pedestrian, comprising: a receiver configured to receive data representing a departure place and a destination transmitted from a portable terminal of the pedestrian; a route data memory configured to storing route data representing position and connection of each route consisting of road network; a route calculation unit configured to calculate a route from the departure place to the destination by referring to the route data in said route data memory; a landmark memory configured to storing landmark data for the pedestrian's confirmation, a landmark representing a signpost of the departure place, the destination, and the route; a landmark selection unit configured to select the landmark data corresponding to the route calculated by said route calculation unit from said landmark memory; and a transmitter configured to transmit route guidance data using the route calculated by said route calculation unit and the landmark data selected by said landmark selection unit to the portable terminal of the pedestrian.

Further in accordance with the present invention, there is also provided a route guidance method for a pedestrian, comprising the steps of: inputting a departure place and a destination of the pedestrian; calculating a route from the departure place to the destination by referring to prestored route data representing position and connection of each route consisting of a road network; selecting a landmark corresponding to the calculated route from prestored landmark data representing a signpost of the departure place, the destination, and the route; and presenting a route guidance for the pedestrian by using the calculated route and the selected landmark data.

Further in accordance with the present invention, there is also provided a computer readable memory containing computer readable instructions, comprising: an instruction unit for causing a computer to input a departure place and a destination of the pedestrian; an instruction unit for causing a computer to calculate a route from the departure place to the destination by referring to prestored route data representing position and connection of each route consisting of a road network; an instruction unit for causing a computer to select a landmark corresponding to the calculated route from prestored landmark data representing a signpost of the departure place, the destination, and the route; and an instruction unit for causing a computer to present a route guidance for the pedestrian by using the calculated route and the selected landmark data.

BRIEF DESCRIPTION OF THE DRAWINGS

FIG. 4 is an example of the initial input display of the route guidance according to the first embodiment.

FIGS. 5A and 5B show an example of the landmark information according to the first embodiment.

FIG. 9 is an example of the initial input display of the route guidance according to the second embodiment.

FIGS. 10A and 10B show an example of the landmark information according to the second embodiment.

FIG. 11 is an example of speech dialogue according to the second embodiment.

FIG. 14 is a schematic diagram showing a control of the route guidance using the accuracy of position acquisition and the accuracy of position confirmation according to the third embodiment.

FIG. 15 is a flow chart of processing of the route guidance system according to the third embodiment.

FIGS. 18A and 18B show an example of the landmark information according to the third embodiment.

FIGS. 24A and 24B show an example of the landmark information according to the fourth embodiment.

FIG. 32 is an example of speech dialogue according to the sixth embodiment.

DETAILED DESCRIPTION OF THE PREFERRED EMBODIMENTS

Figure 1:
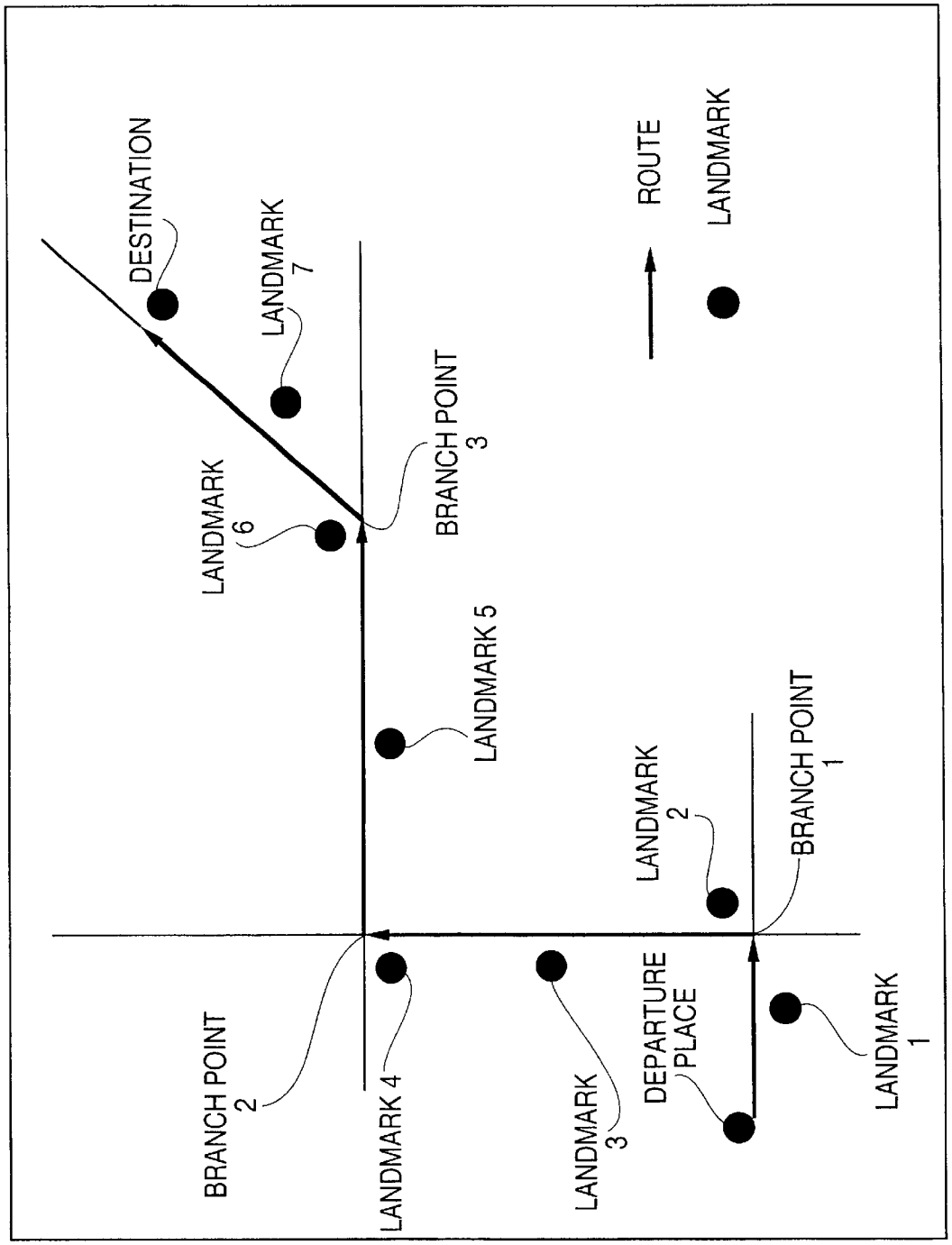
FIG. 1 is an example of a map generated by the route guidance system for a pedestrian according to the present invention.

Hereinafter, embodiments of the present invention will be explained by referring to drawings. First, a first embodiment of the present invention is explained. FIG. 1 shows an example of a map generated by the route guidance system for a pedestrian according to the first embodiment.

As shown in FIG. 1, the map illustrates a route from a departure place to a destination and landmarks along the route. A branch point is a place to change the route such as an intersection. For a pedestrian, example branch points include a marked crosswalk, a pedestrian bridge, and an underpass. The landmark is a structural object or signpost such as a building, a pedestrian bridge, a traffic signal, or a billboard. If the pedestrian arrives at the destination by referring to the map shown in FIG. 1, a position of the branch point to change the route and the landmark to specify the route from the branch point are necessary as minimum conditions. Furthermore, if a distance between the branch points is long, it is difficult for the pedestrian to decide a distance above several ten meters by himself. Therefore, different landmarks are presented in order along the route to the next branch point. In short, the landmark representing the distance of the user's walking to the next branch point is necessary. Furthermore, the landmark to be confirmed on the pedestrian's way is necessary because the pedestrian feels comfortable after confirming that the route of his present walk is correct.

In order to consider a condition of the landmark suitable for pedestrian route guidance, characteristics of the pedestrian must first be considered. In case of the vehicle, as assumption, the driver's age is above sixteen and the driver has knowledge related to a traffic sign such as a road name. However, this kind of limitation is not applied to the pedestrian. Therefore, as the signpost for the pedestrian, a structural object generally known by everyone and recognizable at a glance is needed. As the structural object corresponding to this condition, for example, a convenience store, chain stores such as family restaurants, a post office, a fire station, and a bank, whose billboard and outlook are characteristically unified, are used. Furthermore, other characteristics of the pedestrian are as follows.

(1) The pedestrian walks on a sidewalk near the edge of the road. Therefore, his viewable area is narrower than the vehicle running on a roadway.

(2) Pedestrians walk slow. In general, the speed per hour is four kilometers. It takes one minute and thirty seconds to move one hundred meters.

A function of the landmark is to specify the place. In order to specify the place, a name of the building must be known. A large institution such as a factory or a school are used as a signpost on the road map because a look apparent to be school is recognized from a distance. However, in order for the pedestrian to decide whether it is an elementary school or a middle school, or to confirm a name of the school, he must move near a school gate. As mentioned-above, it is inconvenient for the pedestrian whose moving speed is low. A structural object whose name is easily confirmable from the pedestrian's narrow viewable distance without moving is suitable as the landmark. In other words, the large institute such as a factory and a school is not suitable as the landmark. If a suitable landmark does not exist and a school is used as the landmark for the pedestrian, it must be not be used for the branch point and so on. When checking that the present route is correct by another landmark, the school may be used as a signpost to confirm an advance degree. In this case, an indication so that the user replies as vague confirmation such as "There is a school at the right side." is presented to the user. In short, in FIG. 1, a school is not used as the landmarks 1 or 2. If it is used, selection of the landmark is controlled at the position of the landmarks 3 and 5 so that this landmark is limited to decide a distance of the user's walk.

Figure 2:
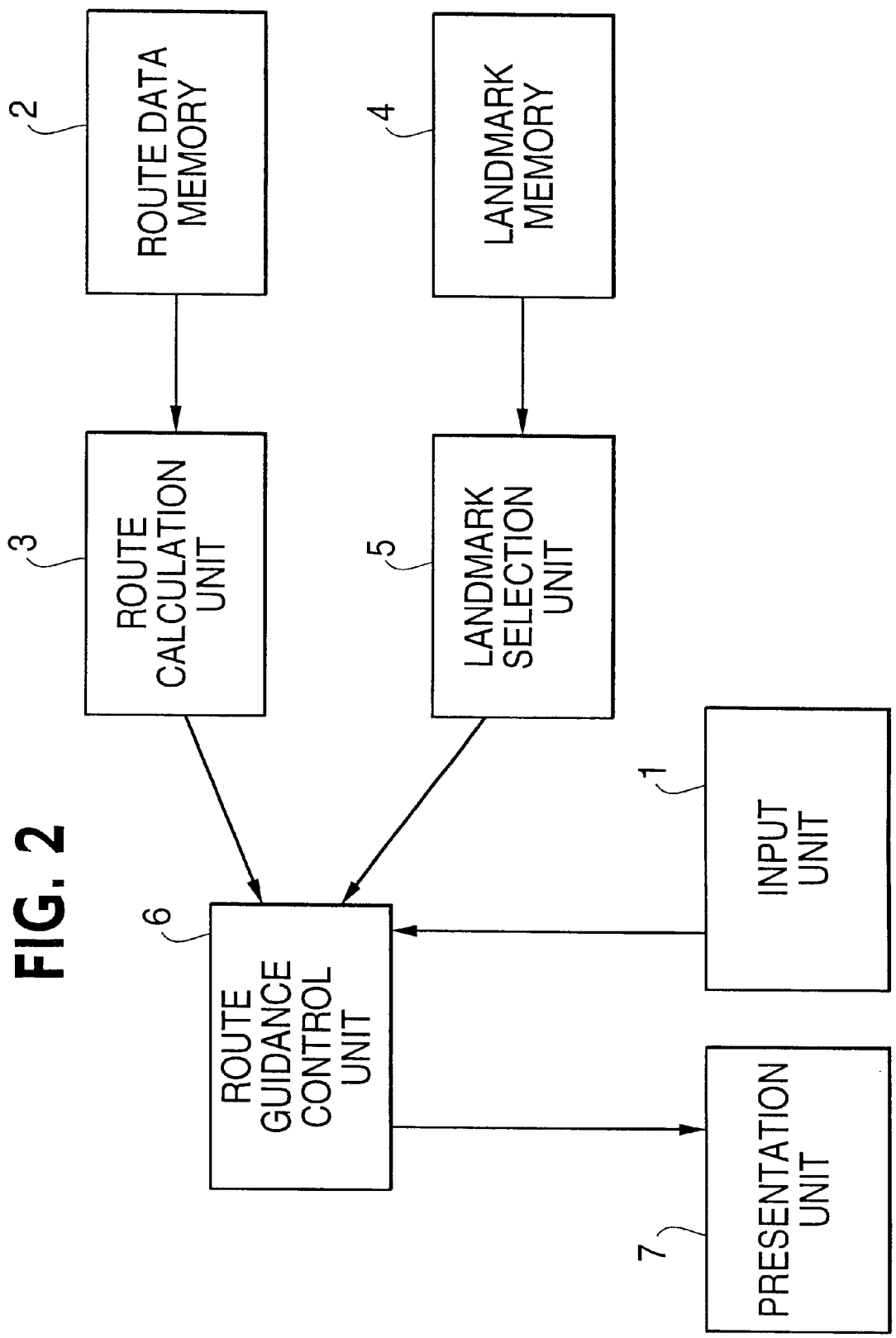
FIG. 2 is a block diagram of the route guidance system according to a first embodiment of the present invention.

FIG. 2 is a block diagram of the route guidance system for a pedestrian according to the first embodiment. An input unit 1 inputs a departure place and a destination to which the user desires route guidance. A route data memory 2 stores network data of roads. A route calculation unit 3 calculates a walk route from the departure place to the destination by using the network data in the route data memory 2. A landmark memory 4 stores the landmark data as the signpost such as a building and an intersection in case of walking. A landmark selection unit 5 selects the landmark suitable for the pedestrian from the landmark data along the route. By using the route calculated by the route calculation unit 3 and the landmark selected by the landmark selection unit 5, a presentation unit 7 presents the route guidance information to the user. A route guidance control unit 6 controls the exchange of data among the units.

Figure 3:
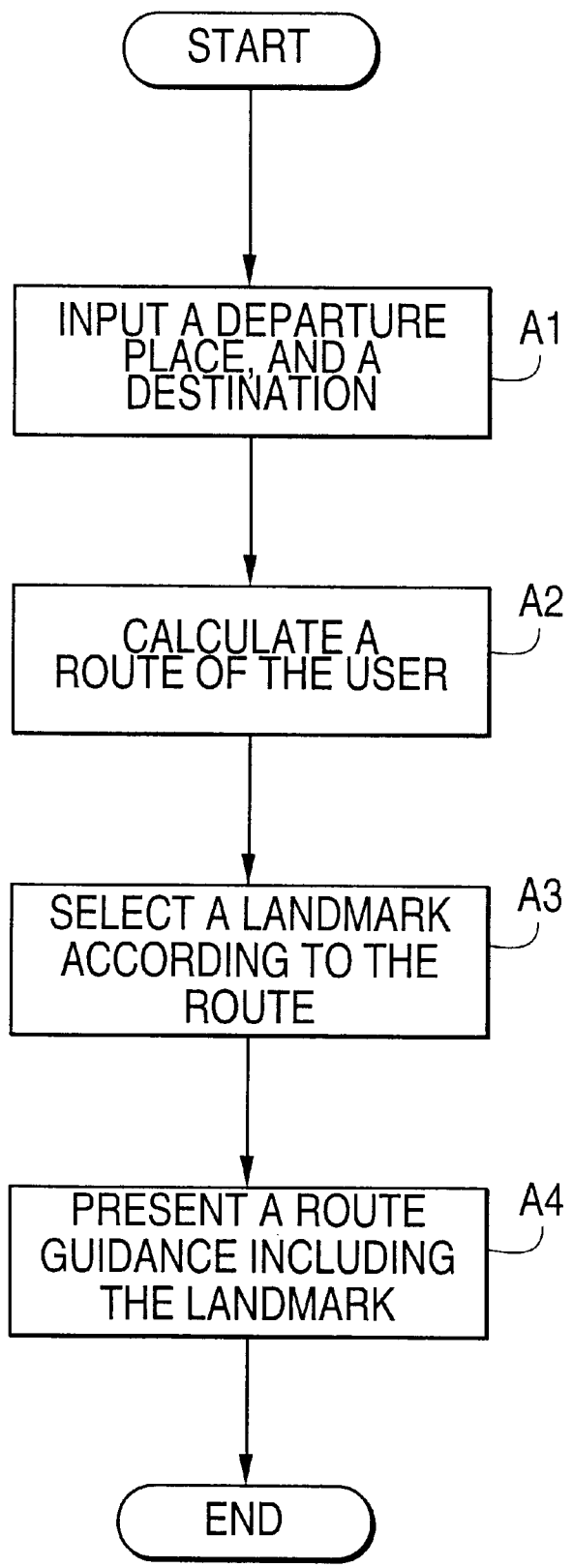
FIG. 3 is a flow chart of processing of the route guidance system according to the first embodiment.

FIG. 3 is a flow chart of processing of the route guidance system according to the first embodiment. In this route guidance system, the execution starts by the user's calling execution of the route guidance. First, the user inputs a departure place and a destination for his walk (step A1). For example, a screen shown in FIG. 4 is displayed and the user inputs the predetermined items. As a method for indicating the departure place and the destination, the user inputs his neighboring station name, landmark name, address, and telephone number. Otherwise, the user may point to a corresponding place on the displayed map. As for the departure place, by using a position acquisition unit specially set, a present position from the position acquisition unit may be automatically set as an initial value, or the user's own house or company may be previously registered. Furthermore, as another input method, by using a speech recognition unit specially set, the speech input may be used.

Next, a route of the user's walk is calculated (step A2). As a method for calculating a route, the route including a sidewalk for the pedestrian is first selected. In this case, for example, Dijkstra's method, a well known algorithm to find the shortest route is used. As a result of route calculation, the route linked from the departure place to the destination is calculated as shown by an arrow in FIG. 1.

Next, landmarks along the route calculated at step A2 are selected (step A3). As shown in FIG. 5A, the landmark memory 4 stores each item by unit of landmark. A landmark ID is a key to discriminate a landmark, and uniquely assigned to each landmark. A name represents detailed information of the landmark, and it is sufficient data to correctly decide which landmark is at the place. A class represents a common name of the landmark, and it is sufficient data to roughly confirm the landmark. A position represents location data of the landmark, and it is indicated as a latitude and a longitude. FIG. 5B shows aptitude data as the landmark for the pedestrian for each class. In FIG. 5B, the aptitude is represented as five step evaluations from "1" to "5". The larger the number is, the higher the aptitude for the pedestrian is. In this example, the school and the factory are not suitable as landmarks. At step A3 in FIG. 3, the landmarks along the route calculated at step A2 are retrieved by referring to the position data of the landmarks. Next, the landmark is selected from the retrieved landmarks by referring to the pedestrian aptitude in FIG. 5B. As for the landmark neighboring the branch point, the landmark of aptitude "5" or "4" is selected, and the landmark of aptitude "1" or "2" is excluded. As for a route between two branch points, in order for the user to confirm to where he walked, the landmark is preferably selected at predetermined intervals. If a plurality of landmarks exist on the same point at the predetermined interval, the landmark of high aptitude is selected. In this way, selection of the landmark suitable for the route guidance is executed.

Figure 6:
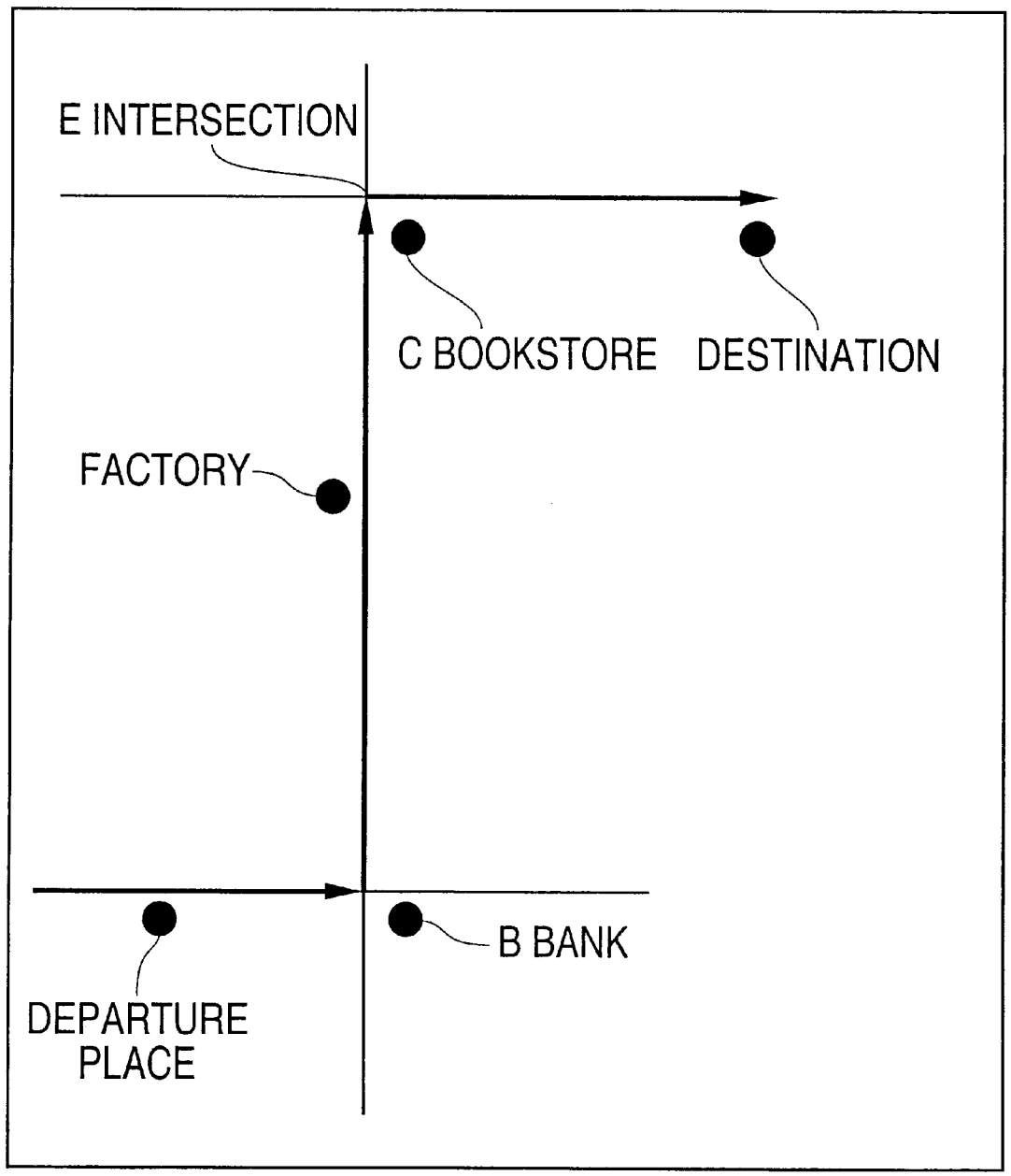
FIG. 6 is an example of presentation of guidance map according to the first embodiment.

Next, by using the route calculated at step A2 and the landmark calculated at step A3, the route guidance is presented to the user (step A4). FIG. 6 shows an example of the route guidance as a map on the display. As the landmark neighboring the branch point, the landmark of high aptitude is selected in order to specify the place, and it is presented as the name. As the landmark on the route between two branch points, the landmark is selected in order for the user to confirm the advance degree, and its aptitude is not necessarily high. Therefore, presentation style is changed by the aptitude. For example, the landmark of high aptitude is presented as the name and the landmark of low aptitude is presented as the class. In FIG. 6, a factory is only selected as the landmark on the route between two branch points. Therefore, it is presented as the class "factory" because of low aptitude. Furthermore, a confirmation of the landmark's name increases the user's burden. Therefore, if a plurality of the same landmarks does not exist on the route, the landmark to confirm the way may be presented as the class, irrespective of the aptitude.

In this way, in the route guidance system of the first embodiment, a landmark easily viewable by the pedestrian and suitable to specify the pedestrian's location is presented. Therefore, the route guidance suitable for the pedestrian is realized.

Figure 7:
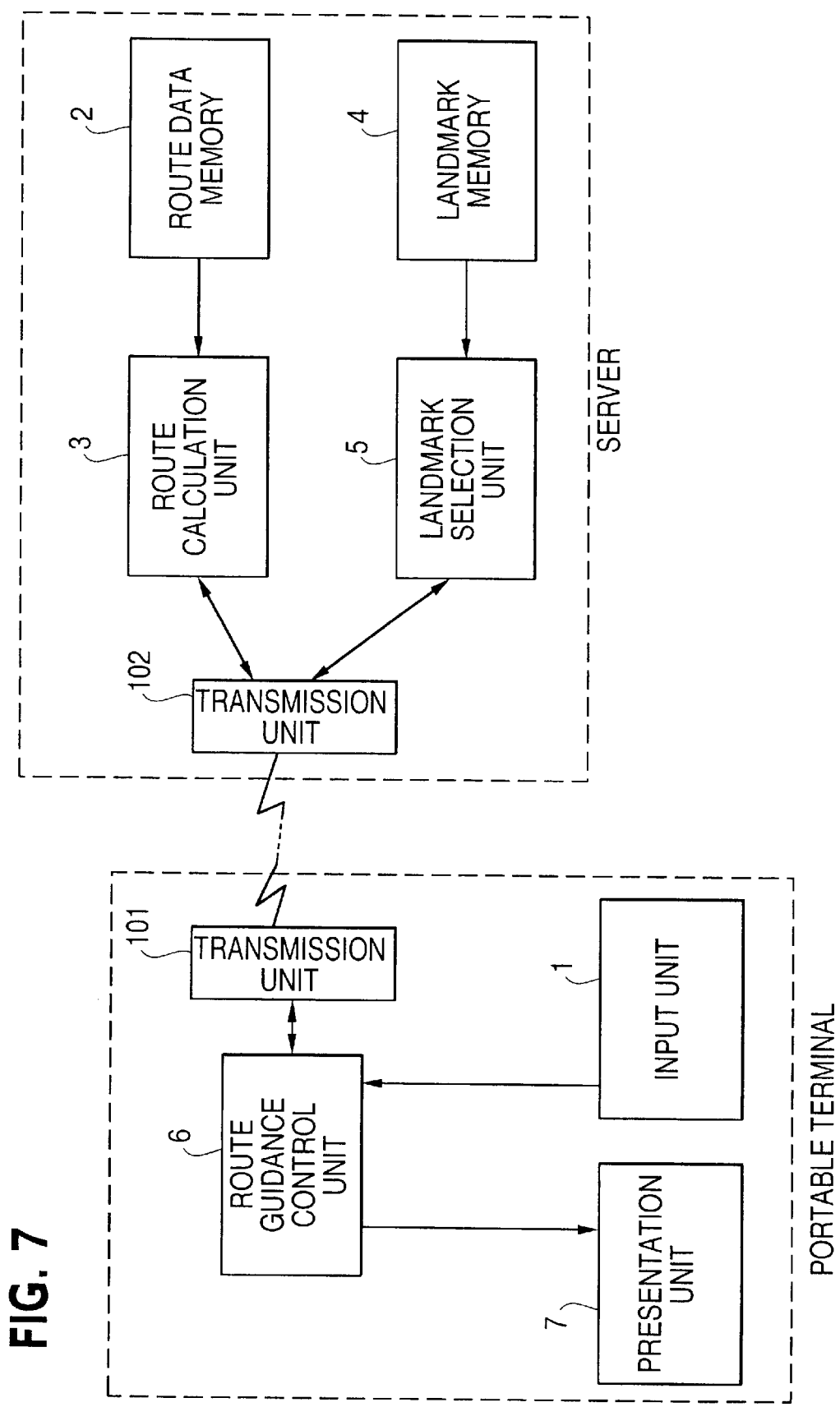
FIG. 7 is a block diagram of the route guidance system according to a modification of the first embodiment.

FIG. 7 is a block diagram of the route guidance system according to a modification of the first embodiment. In FIG. 7, a portable terminal consists of the input unit 1, the route guidance unit 6, the presentation unit 7, and a transmission unit 101. A server consists of the route data memory 2, the route calculation unit 3, the landmark memory 4, the landmark selection unit 5, and a transmission unit 102. The transmission unit 101 in the portable terminal and the transmission unit 102 in the server exchange data for executing the route guidance by wireless communication. The user brings this portable terminal while he walks in a town. In this modification, it is convenient for the user to utilize the route guidance by the portable terminal during his walking.

Next, a second embodiment of the present invention is explained. In the second embodiment, the route guidance is presented using the landmark easily confirmable from the pedestrians actual walk time. The block diagram of the route guidance system of the second embodiment is the same as the block diagram of the first embodiment in FIG. 2. However, in comparison with the first embodiment, the input unit 1 additionally inputs a time of the user's actual walk. The landmark memory 4 additionally stores aptitude time for each landmark. The landmark selection unit 5 selects the landmark to which the aptitude time is matched with the input time along the route from the landmark memory 4.

Figure 8:
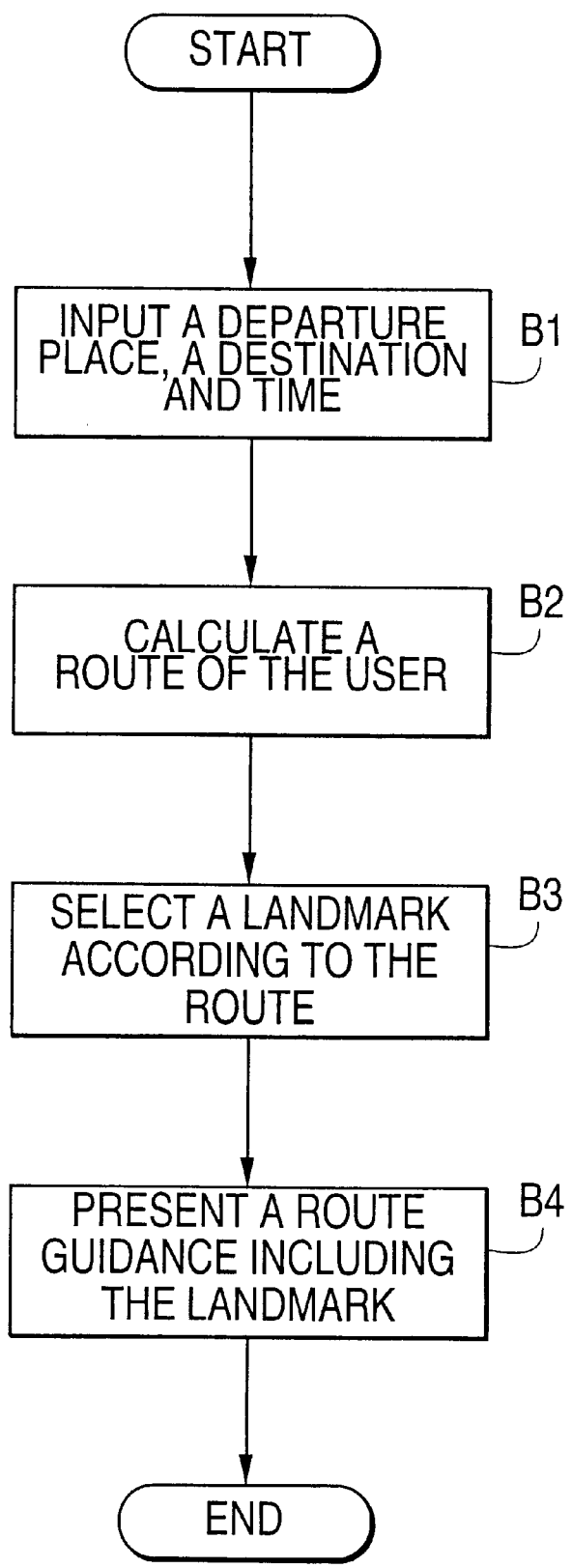
FIG. 8 is a flow chart of processing of the route guidance system according to a second embodiment of the present invention.

FIG. 8 is a flow chart of processing of the route guidance system according to the second embodiment. In this route guidance system, the execution is begun by the user's calling for the route guidance. First, the user inputs a departure place, a destination, and a time of actual walk (step B1). For example, a screen as shown in FIG. 9 is displayed and the user inputs these information through the display. As a method for indicating the departure place and the destination, a station name or a landmark name neighboring the user's house or office, an address, or a telephone number are selectively input. Alternatively, pointing may be operated on the displayed map. As for the departure place, a position acquisition means set as another unit may be combined. A present position acquired from this position acquisition means may be automatically set as an initial value or the user's house and office may be previously registered. Furthermore, the user's actual walk time is input as the time data. In this case, the current time is set as an initial time, and the time and the destination may be set in connection with a schedule management. As another input method, a speech input may be used by a speech recognition.

Next, a route of the user's walk is calculated (step B2). As a result of route calculation, in the same way as in the first embodiment, route data from the departure place to the destination is determined as shown in FIG. 1. Next, landmarks along the route are selected (step B3). As shown in FIG. 10A, the landmark memory 4 stores items of each landmark. A landmark ID is a key to discriminate the landmarks and are uniquely assigned to each landmark. A name is a detailed indication of the landmark, and sufficient data to determine the landmark at that place. A class is the landmark's kind, and sufficient data to roughly confirm the landmark. An aptitude time is a time segment for the pedestrian to confirm the landmark. A position is the location data of the landmark and indicated by longitude and latitude.

FIG. 10B shows default values for the aptitude time of each landmark class. If a landmark does not have an aptitude time, the default value the class of the landmark in FIG. 10B is determined and set as the aptitude time. At step B3, landmarks along the route calculated at step B2 are retrieved from the position data of the landmark. Next, the time input at step B1 is compared with the aptitude time of each landmark, and only landmarks whose aptitude time includes the input time are selected. In this way, the landmark easily confirmable at actual walk time is used as the route guidance.

For example, when the user walks along a shopping street in front of a station, most stores are closed in the early morning, and only a convenience store or a first food shop is used as the landmark. In the daytime, most stores are open and used as the landmark. Reversely, in the nighttime, a neon sign of a restaurant or a bar is conspicuous. In short, stores suitable for the landmark changes by the time even if the stores are located at the same place, and the current time must be taken into consideration for the route guidance for a pedestrian.

Next, the route guidance is presented to the user by using the route calculated at step B2 and the landmark selected at step B3 (step B4). As shown in FIG. 6, the route guidance is displayed through a screen display apparatus. Furthermore, the route guidance may be announced by speech in order. FIG. 11 shows an example of the route guidance data executed by a speech dialogue. In a system side, these text data are output as the speech by speech synthesis. In a user side, if an indication from the system is confirmed, the user replies "Yes". If the indication is not confirmed, the user replies "No.". In FIG. 11, this reply is represented as the speech recognition result.

Figure 12:
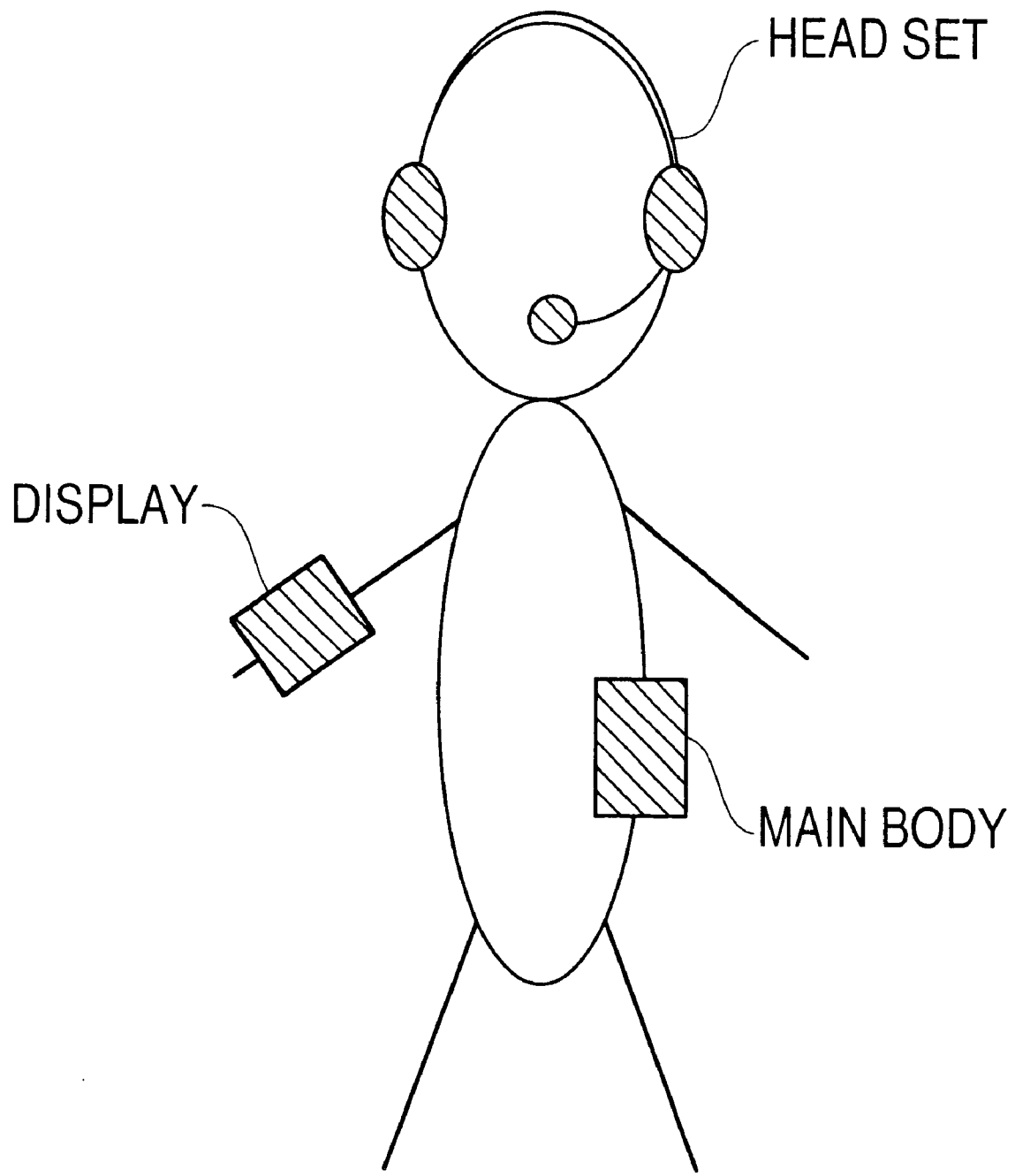
FIG. 12 is an example of portable type of the route guidance system according to the second embodiment.

FIG. 12 shows a portable example of a route guidance system. The user executes an indication and a dialogue by speech through a microphone of a head set and walks by following the route guidance indication from a speaker. In addition to this, the user may bring a head mounted display or a small display and confirm a distance to the next branch point on the map. Furthermore, a map or a guidance sentence may be displayed on a screen of a cellular phone without the head set, and the guidance sentence may be output by speech synthesis through the cellular phone.

In this way, in the route guidance system of the second embodiment, the landmark easily confirmable at the user's actual walk time is presented by referring to a street scene changing by passage of time. Accordingly, a route guidance suitable for a pedestrian is realized. In case that the route guidance to the store such as a town information service is actually presented, the route guidance corresponding to 24 hours service is possible.

Figure 13:
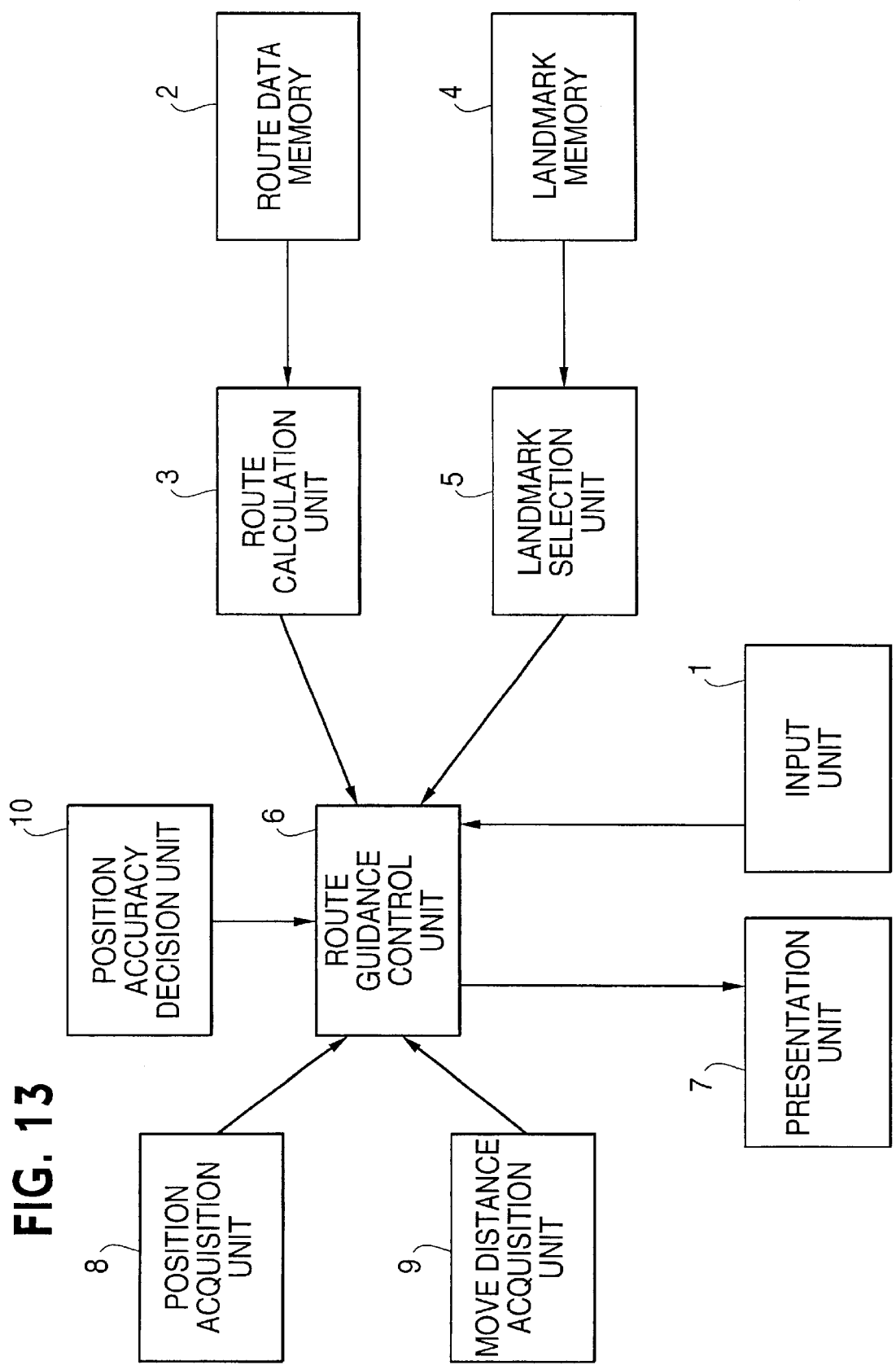
FIG. 13 is a block diagram of the route guidance system according to a third embodiment of the present invention.

Next, a third embodiment of the present invention is explained. In the third embodiment, a means for obtaining a user's present position, a means for measuring a move distance of the user, and a means for deciding an accuracy of the present position are added, and a route guidance method for the user is changed by the accuracy. FIG. 13 is a block diagram of the route guidance system according to the third embodiment. As shown in FIG. 13, in addition to the block diagram in FIG. 2, a position acquisition unit 8 to acquire the user's present position, a move distance acquisition unit 9 to measure a move distance of the user, and a position accuracy decision unit 10 to decide an accuracy of the present position by the data from the position acquisition unit 8 and the reply from the user are added.

The position acquisition unit 8 detects a present position of the user such as a satellite receiving GPS or a local positioning service of a cellular phone. Furthermore, a beacon using an electric wave or an infrared ray set at a sidewalk or a store indicates present position. As the position data, except for the longitude and the latitude, an ID representing a place or the address are used. The move distance acquisition unit 9 counts the number of steps such as a pedometer in response to a request from the route guidance control unit 6.

The position accuracy decision unit 10 decides two kinds of accuracy as an accuracy of position acquisition and an accuracy of position confirmation. The former is the accuracy of the position acquisition unit 8. The accuracy of position acquisition changes by a method such as GPS or PHS used for the position acquisition unit. For example, in case of GPS, the present position is obtained at an accuracy within 100 m. However, this accuracy is affected by the number of satellites, and the receiving from the satellite is not often executed in case of the pedestrian. The position accuracy decision unit 10 obtains a present accuracy or a receiving state information necessary for decision of the accuracy from the position acquisition unit 8, and decides the accuracy of position acquisition. The latter represents an accuracy of match degree between the route guidance position of the system and the actual position of the user's walk. In this case, a method for changing the route guidance for the pedestrian by the accuracy of position acquisition and the accuracy of position confirmation is explained by referring to FIG. 14.

In FIG. 14, the accuracy of position acquisition and the accuracy of position confirmation are respectively classified into two levels (high and low) and four patterns are selectively controlled by combination of each state. First, a confirmation frequency of landmark is changed by the accuracy of position acquisition. In case of high accuracy of position acquisition, for example, if the position is acquired with an accuracy of 20 m, the present position from the position acquisition unit 8 is within a viewable limit of the user in full, and it is not necessary for the user to frequently confirm the present position by confirming the landmark. Therefore, a frequency of confirmation is set low, and an interval distance of confirmation is set long. Reversely, in case of low accuracy of position acquisition, for example, if the position error is above 100 m, the present position from the position acquisition unit 8 may be greatly beyond the viewable limit of the user. Therefore, it is necessary for the user to confirm the present position by frequent confirmation of the landmark.

As for the accuracy of position confirmation, an explanation method of the landmark is changed. In case of high accuracy of position confirmation, position confirmation is certainly executed by a dialogue and it is decided that the user walks along the correct route. Therefore, the explanation of the landmark is executed in a decision tone, and a confirmation from the user is not always necessary to continue the dialogue. Reversely, in case of low accuracy of position confirmation, irrespective of the accuracy of position confirmation, a position confirmation by the dialogue is not sufficiently executed, and it is decided that the user is not walking along the correct route or a shift by a passage of time largely occurs. Therefore, the explanation of the landmark is executed in a confirmation tone, and the confirmation from the user must be obtained in order to continue the dialogue.

Figure 16:
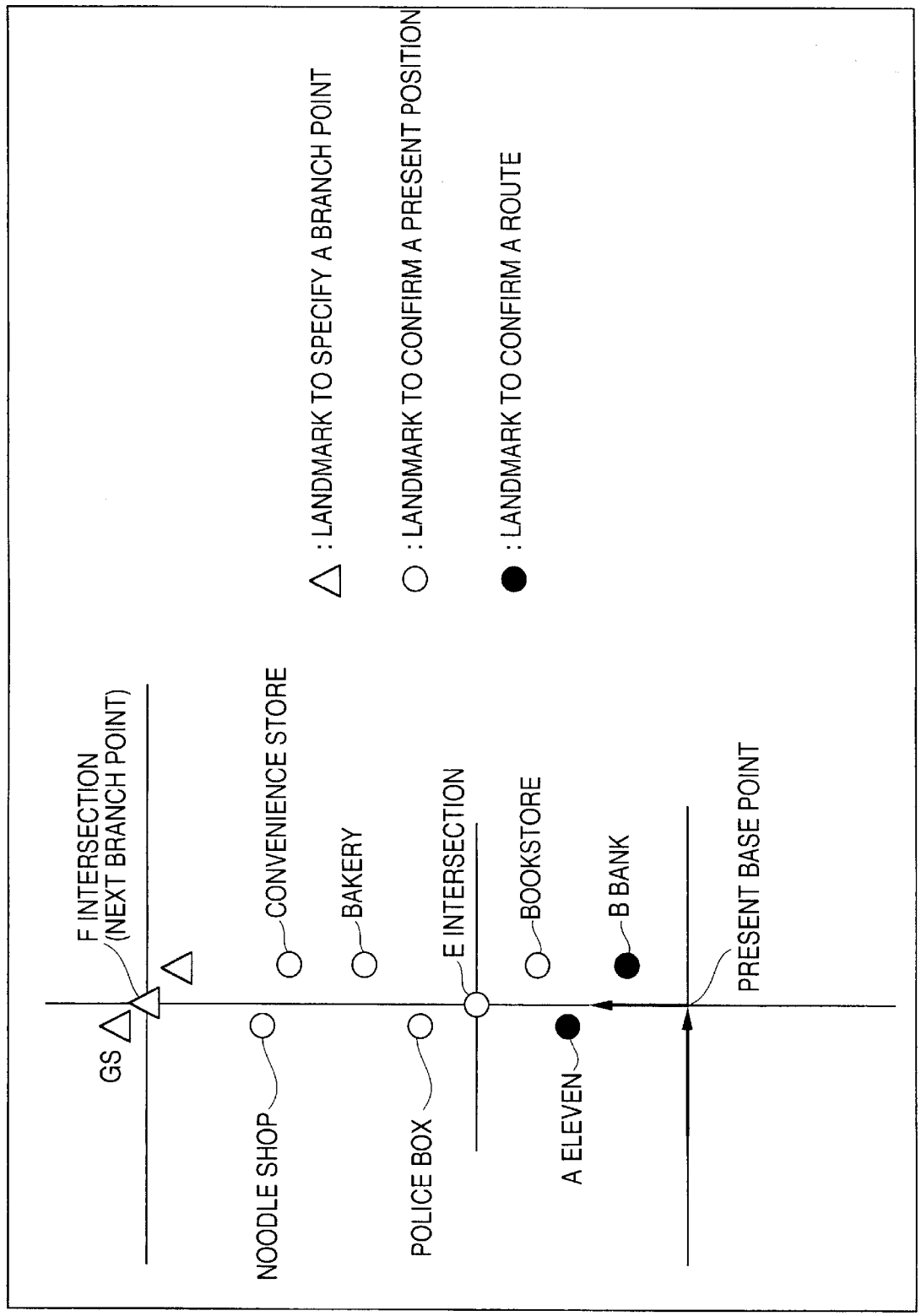
FIG. 16 is a schematic diagram showing an outline of route guidance operation to the next branch point according to the third embodiment.

FIG. 15 is a flow chart of processing of the route guidance system according to the third embodiment. In FIG. 15, steps C1~C3 are executed in the same way as in the second embodiment. Hereinafter, in the third embodiment, an operation to guide to the next branch point is repeated untill arriving at the destination. In FIG. 15, steps C5~C7 are guidance operations to the next branch point, and this operation is repeated untill the present position is the destination. By referring to FIG. 16, an outline of the route guidance operation (steps C5~C7) to the next branch point is explained. First, an advance direction from the present position (a departure point or a branch point) is confirmed (step C5). The confirmation of advance direction is executed by confirmation of a landmark such as a black circle neighboring a branch point in FIG. 16. The landmark used for confirmation of the advance direction does not exist on other routes and is within a viewable distance from the branch point. In FIG. 10A, a name of the landmark easily confirmable is first selected. Next, an interval distance to confirm the landmark is determined by the accuracy of position acquisition, and the landmark is confirmed at the interval distance (step C6). In FIG. 16, a white circle is the landmark to confirm the present position. When the user approaches the next branch point, a confirmation of the branch point is executed (step C7). In order to specify the branch point, the landmark represented by a triangle in FIG. 16 is confirmed. The above operation (C5~C7) is repeated untill the user arrives at the next branch point.

Figure 17:
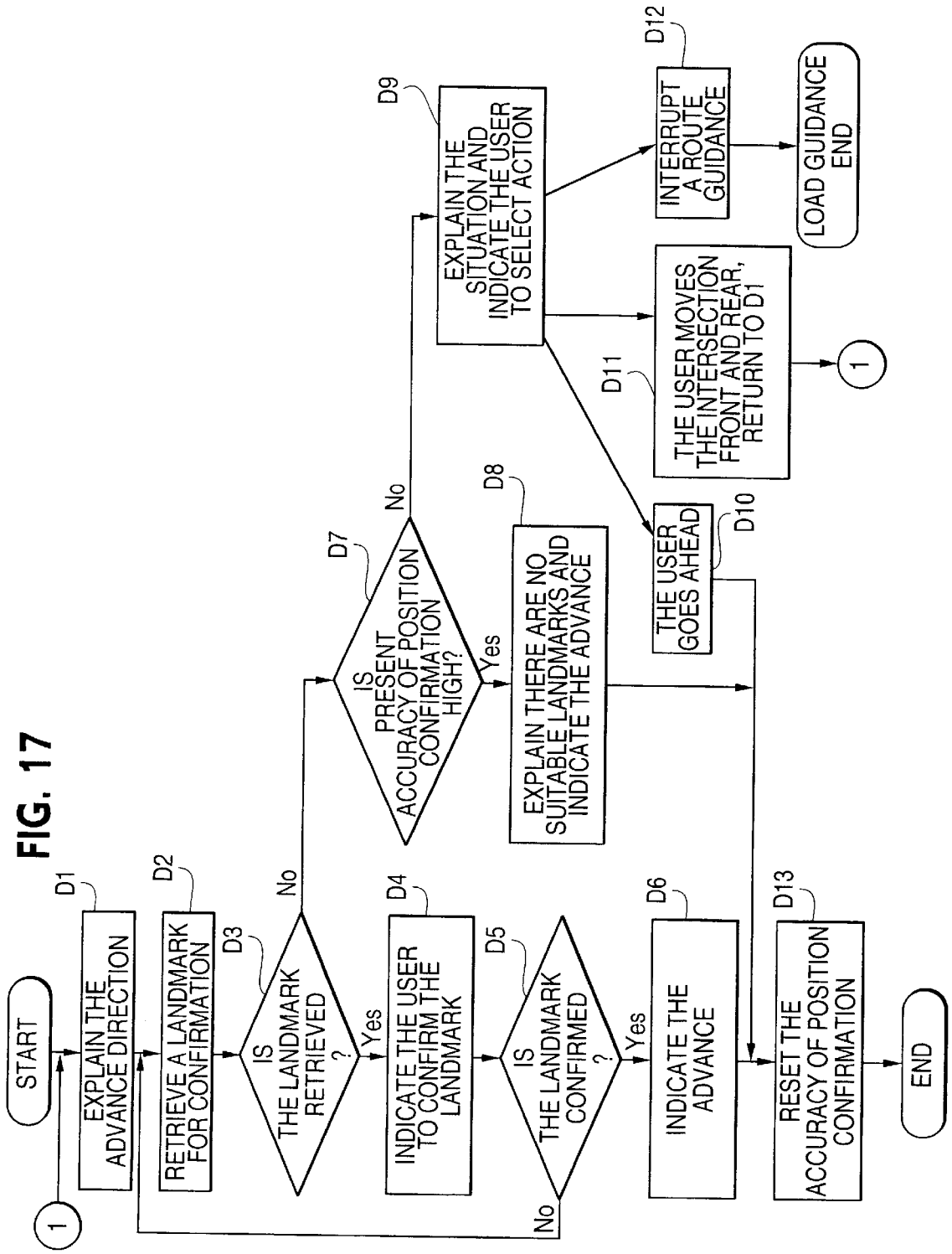
FIG. 17 is a flow chart of detail processing of step C5 in FIG. 15.

FIG. 17 is a flow chart of a detailed operation of step C5. First, the advance direction from the branch point is explained (step D1). For example, "Please turn to the right" is outputted. If the present position is the departure point, the indication of the advance direction is not necessary. Next, in order to confirm that the new course is correctly selected or in order to present a route in case that the present position is the departure point, landmarks for confirming the route are selected (step D2). Each landmark includes items as shown in FIG. 18A. In comparison with the second embodiment, the landmark additionally includes a viewable distance representing a maximum distance for the user to confirm by sight. The viewable distance changes over time and because of weather, and it is preferably set for each case. In FIGS. 18A, and 18B, daytime and nighttime are set.

In the same way as in the second embodiment, in addition to the consideration of the time, the landmark whose distance from the branch point is within the viewable distance is selected. If a corresponding landmark does not exist, the operation is advanced to step D7. If the corresponding landmark is selected, the operation is advanced to step D4 (step D3). In the latter case, a confirmation of the landmark is indicated to the user (step D4). For example, in FIG. 16, a question such as "Is there B bank at the right side forward as 20 m ?" is presented to the user as the confirmation of the landmark. By using a pointing device or a speech recognition means of the input unit 1, the user's confirmation of visible/invisible for the landmark is input (step D5). If the landmark is invisible (not confirmed), the operation is returned to step D2 in order to confirm another landmark. On the other hand, if the landmark is visible (confirmed) to the user, a message that the route is correct is informed to the user (step D6). For example, "Please advance as it is." is presented to the user and the operation is advanced to step D13.

If the landmark is not confirmed and another landmark is not retrieved, the accuracy of position confirmation of the position accuracy decision unit 10 is confirmed (step D7). If the accuracy of position confirmation is high, the explanation that a present branch point is correct, but a suitable landmark does not exist is presented, and an indication to advance along this route is presented to the user (step D8). On the other hand, if the accuracy of position confirmation is low, it is not sufficiently confirmed whether the present branch point is correct. Accordingly, an explanation that the present position may not be correct is presented, and an indication to select the next action is presented to the user (step D9). For example, if the user goes ahead as it is by his decision (step D10). Otherwise, the user moves to an intersection front and rear of the present position, and a confirmation of the route is executed again from step D1 (step D11). Furthermore, if the route guidance is decided to be difficult, the route guidance by the system is interrupted, and the user goes to the destination by watching his own map (step D12). Last, the accuracy of position confirmation is reset by confirmation situation of the landmark (step D13). For example, if the landmark is not confirmed, the accuracy of position confirmation is set low. If the landmark is confirmed, the accuracy of position confirmation is set high.

Figure 19:
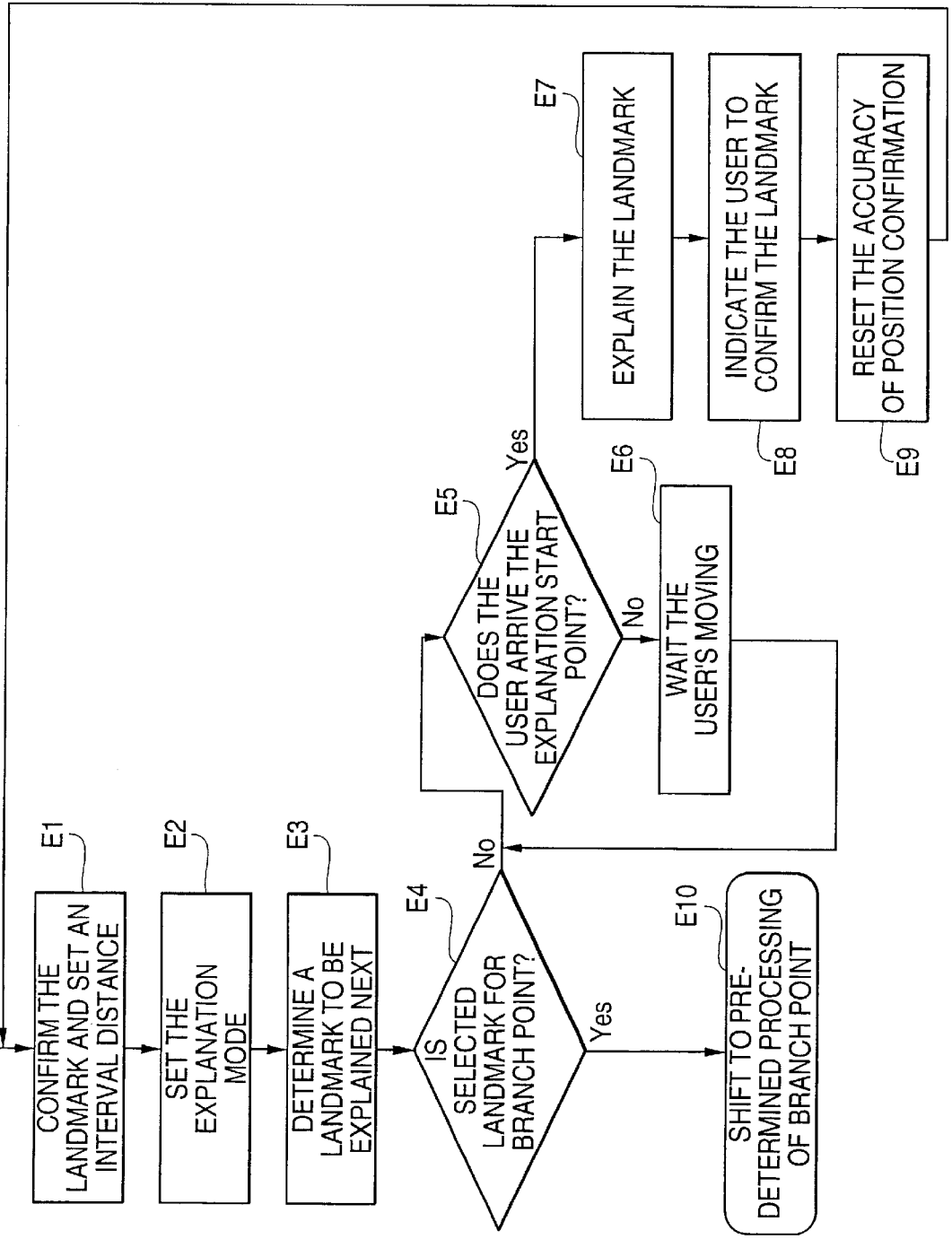
FIG. 19 is a flow chart of detail processing of step C6 in FIG. 15.

Next, FIG. 19 is a flow chart of the detailed operation of step C6. First, an interval distance to confirm the landmark is set by the accuracy of position acquisition of the position accuracy decision unit 10 (step E1). For example, as shown in FIG. 14, if the accuracy of position acquisition is high, the interval distance is set as 100 m. If the accuracy of position acquisition is low, the interval distance is set as 30 m. Next, by referring to the accuracy of position confirmation of the position accuracy decision unit 10, an explanation mode of the landmark is set as a decision mode or a confirmation mode (step E2). For example, as shown in FIG. 14, if the accuracy of position confirmation is high, the decision mode is set. If the accuracy of position confirmation is low, the confirmation mode is set. Then, a landmark which departs from the present position as the interval distance set at step E1 is selected (step E3). In this case, the landmark is selected by referring to the position and the aptitude time in the landmark memory shown in FIG. 18A. If the selected landmark is located near the next branch point, the operation is advanced to step E10 (C7). If the selected landmark is not located near the next branch point, the operation is advanced to step E5 (step E4).

Figure 20:
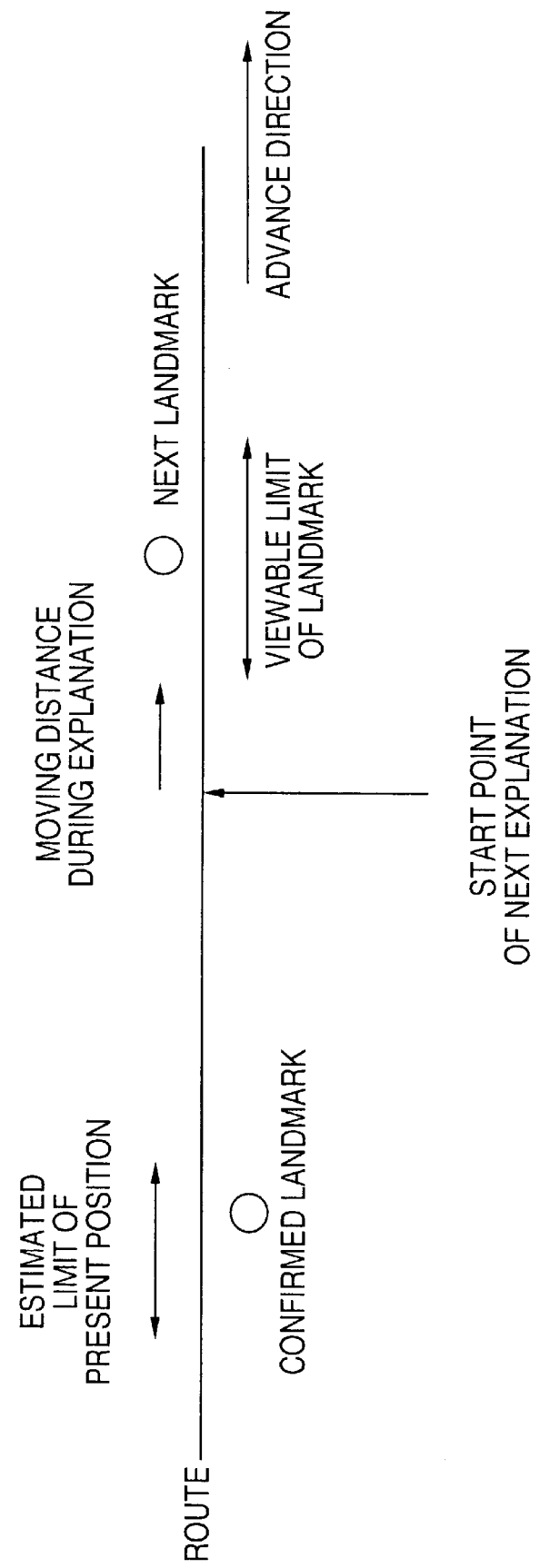
FIG. 20 is a schematic diagram of timing chart to indicate a landmark confirmation according to the third embodiment.

In this case, by referring to FIG. 20, a timing to indicate a confirmation of landmark to the user is explained. The interval distance to confirm the landmark changes by the accuracy of position. Therefore, the indication timing must be adjusted. It is desired that the explanation starts at a point of this side where the user can barely confirm the landmark to be confirmed. In short, the start point of explanation is a point of this side from a position of next landmark by a sum of viewable distance of the next landmark and the user's moving distance during the explanation. Therefore, the move distance acquisition unit 9 begins to measure the distance a user walks from a point where previous landmark is confirmed. At a time when the user walks a set distance from the previous landmark to the start point, the explanation starts (step E5~E6).

Next, the landmark is explained by the explanation mode set at step E2 (step E7). For example, in case of the decision mode, "There is a bookstore at the right side" is presented to the user. In case of the confirmation mode, "Is there a bookstore at the right side ?" is presented in order for the user to confirm. In addition to this, in case of the decision mode, the landmark may be explained according to class. In case of the confirmation mode, the landmark may be explained according to name. For example, in case of the decision mode, "There is a bookstore at the right side" may be presented. In case of the confirmation mode, "Is there Sato bookstore at the right side ?" may be presented.

Next, an indication for the user to confirm the landmark is presented to the user (step E8). In case of the decision mode, the distance traveled from the move distance acquisition unit 9 is decided. If the user moves to an estimated position of the landmark and the user's reply is not input, the operation is returned to step E1. In case of the confirmation mode, the system waits for the user's reply of confirmation. If the user moves to the estimated position of the landmark and the user's reply is not input, the reply is requested again. As for the confirmation, the user inputs a confirmation of visible/invisible of the landmark through a pointing device or a speech recognition means of the input unit 1. Then, the accuracy of position confirmation is reset by the user's confirmation result (step E9). For example, if the landmark is not confirmed, the accuracy of position confirmation is set low. If the landmark is confirmed, the accuracy of position confirmation is set high.

Figure 21:
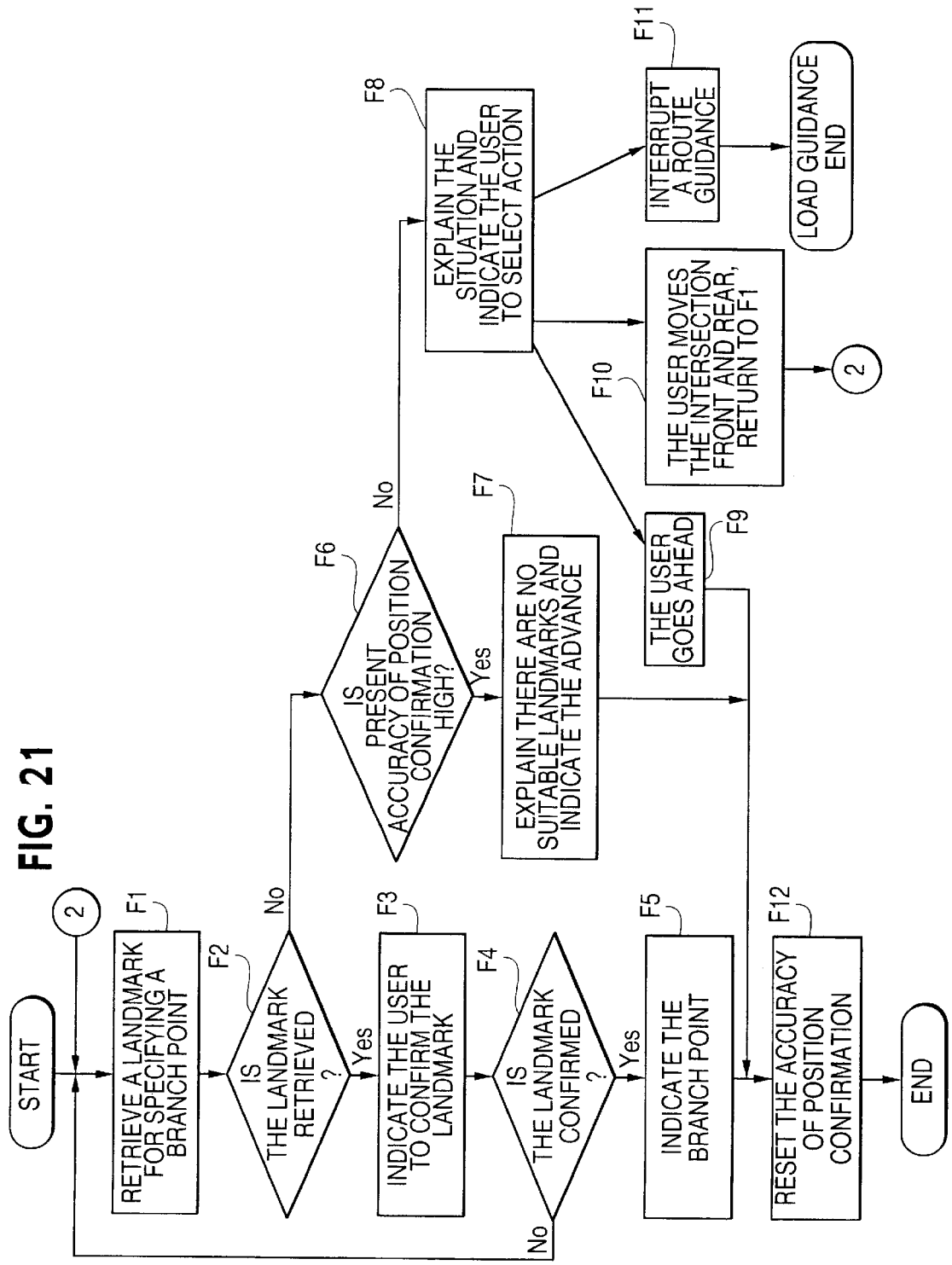
FIG. 21 is a flow chart of detail processing of step C7 in FIG. 15.

FIG. 21 is a flow chart of the detailed processing of step C7. This processing is executed in almost the same way as in FIG. 17. Therefore, this explanation is omitted. As mentioned-above, a dialogue method in case of confirming the landmark changes by the accuracy of position acquisition and the accuracy of position confirmation. Therefore, an adequate route guidance matched with the situation is executed.

In this way, in the route guidance system of the third embodiment, the route guidance for the user is executed by the accuracy of position acquisition and the accuracy of position confirmation. As a result, troublesome confirmation work is not requested of the user beyond necessity. Reversely, necessary confirmation of the user is not neglected. In short, the route guidance is realized to minimize a burden to the user.

Figure 22:
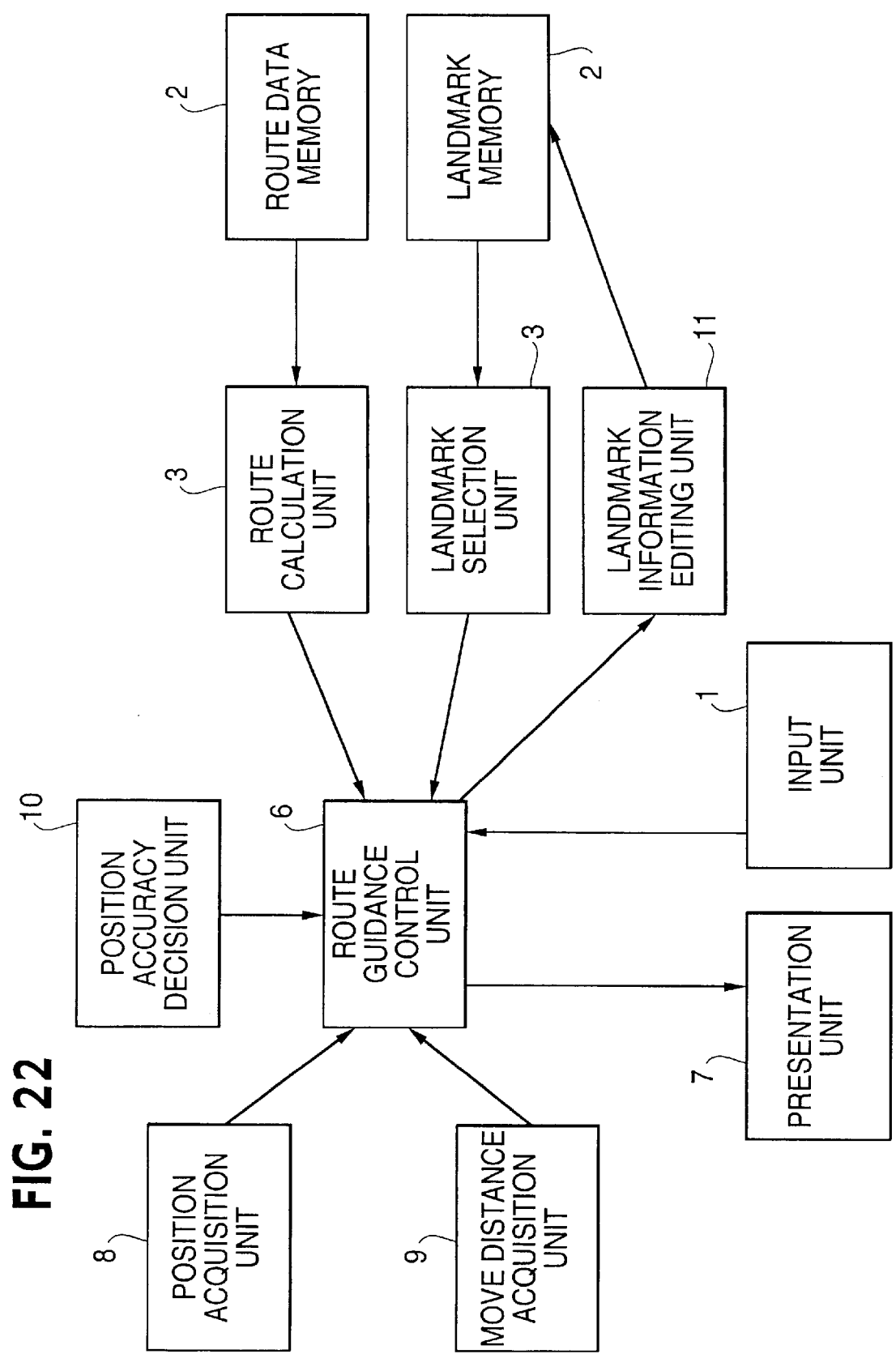
FIG. 22 is a block diagram of the route guidance system according to a fourth embodiment of the present invention.

Next, a fourth embodiment of the present invention is explained. In the above-mentioned third embodiment, the route guidance is interactively executed through a dialogue to the user. In the fourth embodiment, a means for editing landmark information through the dialogue with the user is added. The route guidance system for learning the landmark information and for reflecting the learned result on the next route guidance is explained. FIG. 22 is a block diagram of the route guidance system according to the fourth embodiment. As shown in FIG. 22, in comparison with the block diagram of the third embodiment in FIG. 13, a landmark information editing unit 11 is added. The landmark information editing unit 11 decides which landmark is viewable from where and by which level through a dialogue of landmark confirmation to the user, and edits the landmark information in the landmark memory 2.

Figure 23:
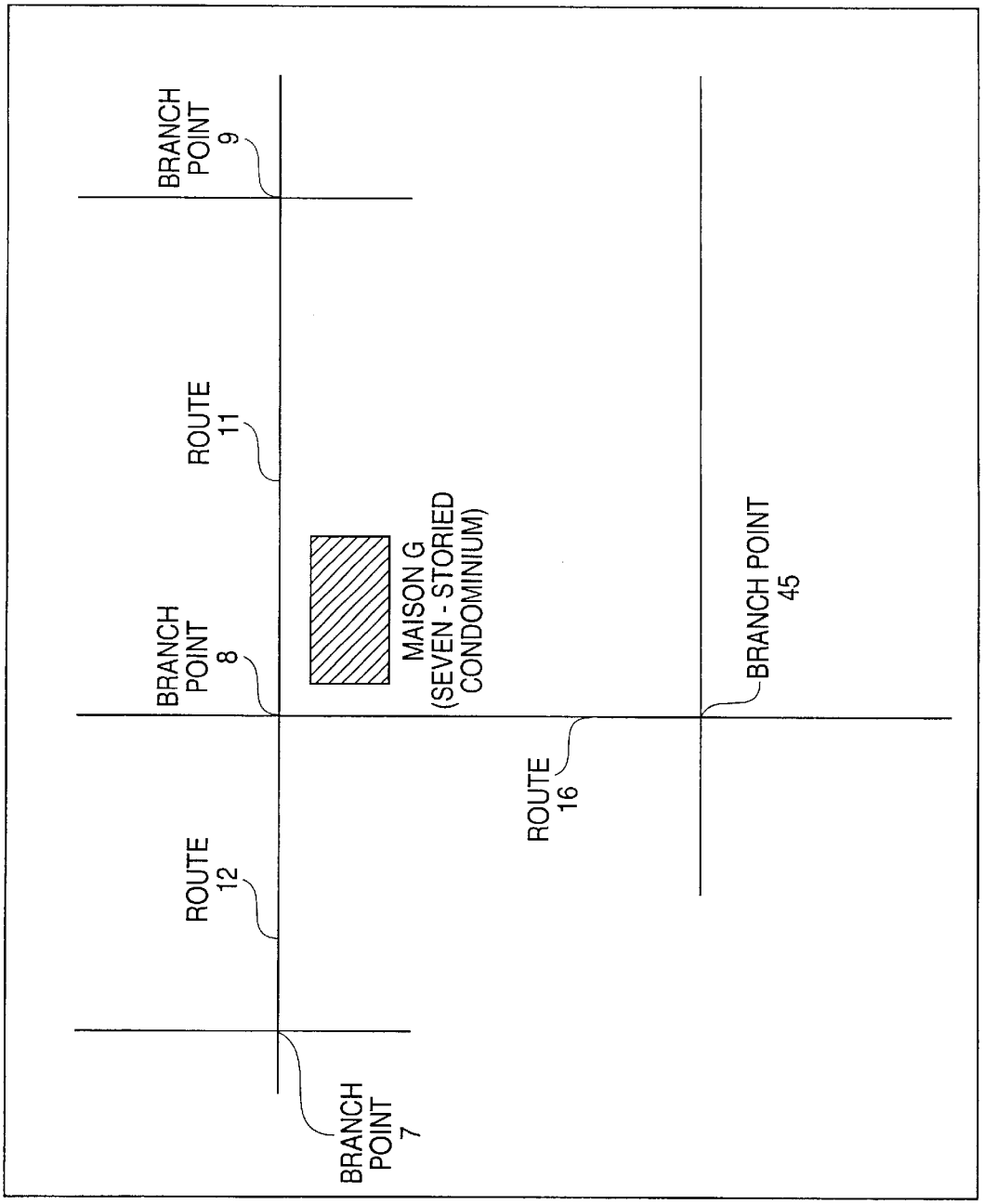
FIG. 23 is a schematic diagram showing acquisition of the landmark information according to the fourth embodiment.

By referring to FIG. 23, a method for acquiring landmark information from the dialogue is explained. In FIG. 23, as a landmark to specify a branch point 8, a seven-storied condominium called "miaison G" is used. If the user walks from the branch point 9 to the branch point 8 and turns to the branch point 45, this route guidance system requests the user for a confirmation "Is there a maison G at the left side ?" at this side of the maison G on the route 11. If the user replies "Yes.", this building is decided to be confirmed the name from the branch point 9 side on the route 11. If the user replies "No.", the route guidance system further presents a question "Is there a condominium ?" or "Can you see a seven-storied building ?" to the user. By using this dialogue, for example, the user's reply "I can see a seven-storied building but not find the name." is obtained. When the user is requested for confirmation of object not confirmable, he feels uneasiness. Therefore, if the name of the building is previously decided not to be confirmed, an explanation "Is there a seven-storied building at the left side ?" of the landmark from next time is preferably presented.

FIGS. 24A and 24B show the landmark information stored in the landmark memory 2 in the fourth embodiment. In comparison with the landmark information in FIG. 18, landmark confirmation data shown in FIG. 24B are added. A landmark ID is a key to discriminate the landmark. For example, ID "4" represents "MAISON G" in FIG. 24A. A route ID is a key to discriminate the route and a branch point ID is a key to discriminate the branch point. In FIG. 24B, a combination of the route ID and the branch point ID represents the case from which branch point along which route the user walked before. A time represents the time when the confirmation was executed. A confirmation level represents by which level the landmark is confirmed. In this case, three levels (name, class, number of stories) are selectively set. The name is a sufficient level to specify the landmark. By proceeding from the class to the number of stories, the confirmation becomes ambiguous. The first line of data in FIG. 24B represents that if the user walks near maison G from the branch point 8 along the route 11, the name "MAISON G" is confirmed at 13 hour. In short, the name of building "MAISON G" is confirmable in this situation.

Figure 25:
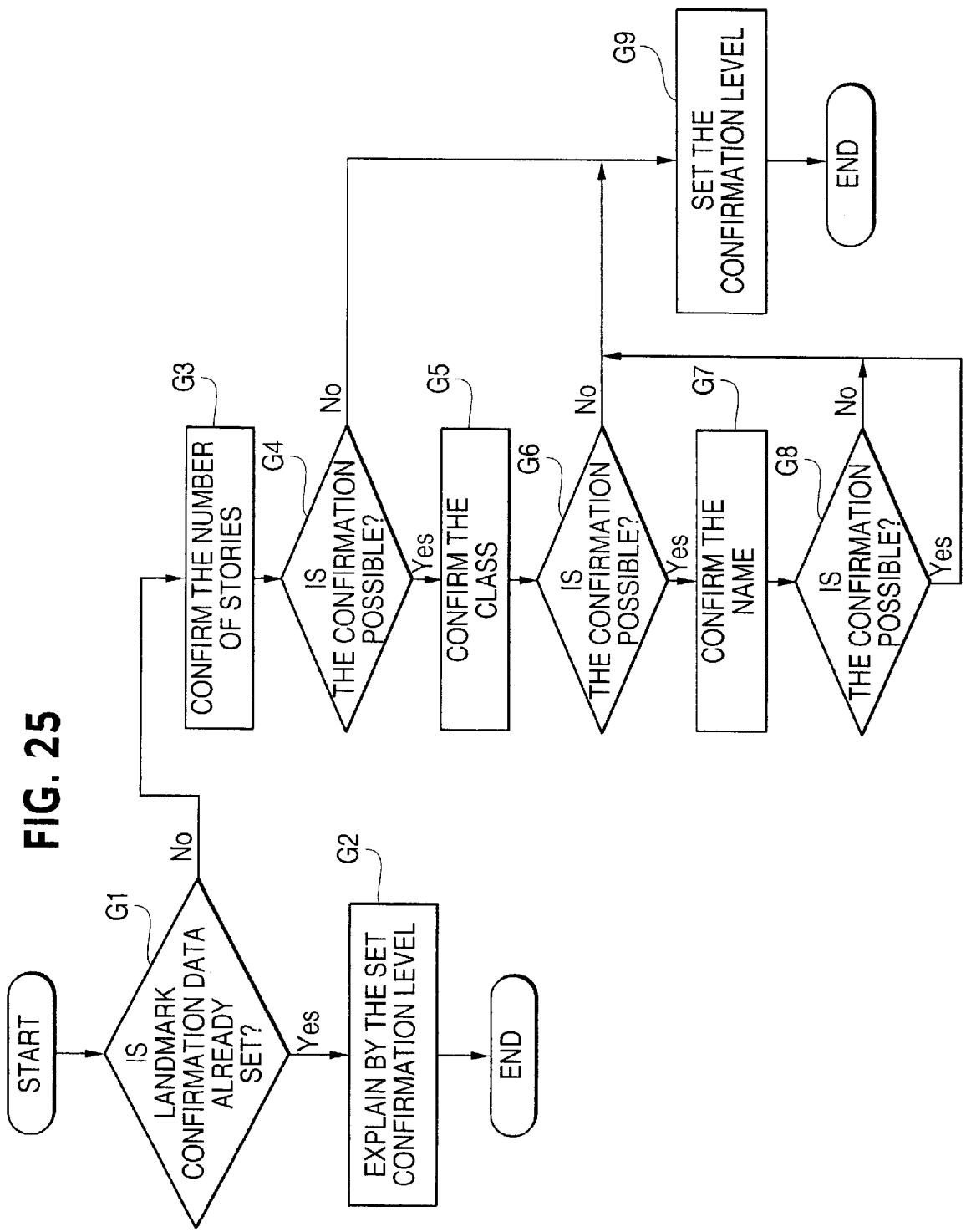
FIG. 25 is a schematic diagram showing a speech dialogue of landmark confirmation process according to the fourth embodiment.

FIG. 25 is a flow chart of processing of the dialogue operation in the fourth embodiment. The operation in FIG. 25 represents a confirmation of the landmark executed between the system and the user, and the operation is executed in the same way as in the fourth embodiment. First, as for the selected landmark, it is checked whether the landmark confirmation data corresponding to the present route is already set (step G1). The landmark confirmation data is retrieved from the landmark memory 2 by referring to the landmark ID, the route ID, the branch point ID, and the time. If corresponding landmark confirmation data is already set, the landmark is explained by the confirmation level (step G2). For example, if the confirmation level is the class, the explanation "There is a bookstore at the right side." is presented. If corresponding landmark confirmation data is not set, a level to confirm the landmark is not decided. Accordingly, the landmark is confirmed from the most ambiguous level in order. First, the number of stairs is confirmed (step G3). For example, Is there a seven-storied building ?" is presented to the user. If the confirmation is possible by the user, the class is further confirmed (step G5). For example, "Is it a condominium ?" is presented to the user. If this confirmation is also possible by the user, the name is further confirmed (step G7). For example, "Is it MAISON G ?" is presented to the user. In this case, in order for the user to avoid the uneasiness by non-confirmation, before "Is it MAISON G ?" is presented, "Can you find the building's name" is presented to the user. If the user replies "Yes.", a dialogue step to further ask the user about the name may be presented.

By above-mentioned confirmation result, it is decided which level the landmark is confirmed by. As for the landmark, landmark confirmation data (the landmark ID, the route ID, the branch point ID, the time, the confirmation level) is newly added (step G9). In this case, as for a landmark whose number of stories is not confirmed, "disquality" as the confirmation level is set and the landmark is not selected for this route starting from the next time. Furthermore, at step G1, even if the landmark confirmation data for walking from the direction along the route is not set, if another confirmation data for walking from the reverse direction along the same route is set, the another confirmation data may be substituted because a viewable level along same route is not largely changed by different direction. Furthermore, the convenience store and family restaurant are confirmed at a glance in many cases. In general store, confirmation by the class is largely used. Therefore, an item of the confirmation level may be added as a default value of the landmark information of each class in FIG. 18B.

In this way, in the route guidance system of the fourth embodiment, once the landmark is confirmed, this landmark can be confirmed by fewer dialogues starting from the next time. The landmark confirmation data, which landmark is suitable, and the aptitude time are stored whenever the confirmation is executed. Furthermore, by commonly using the landmark confirmation data, as for a place where someone has gone once, better route guidance of this place is presented to other users.

Figure 26:
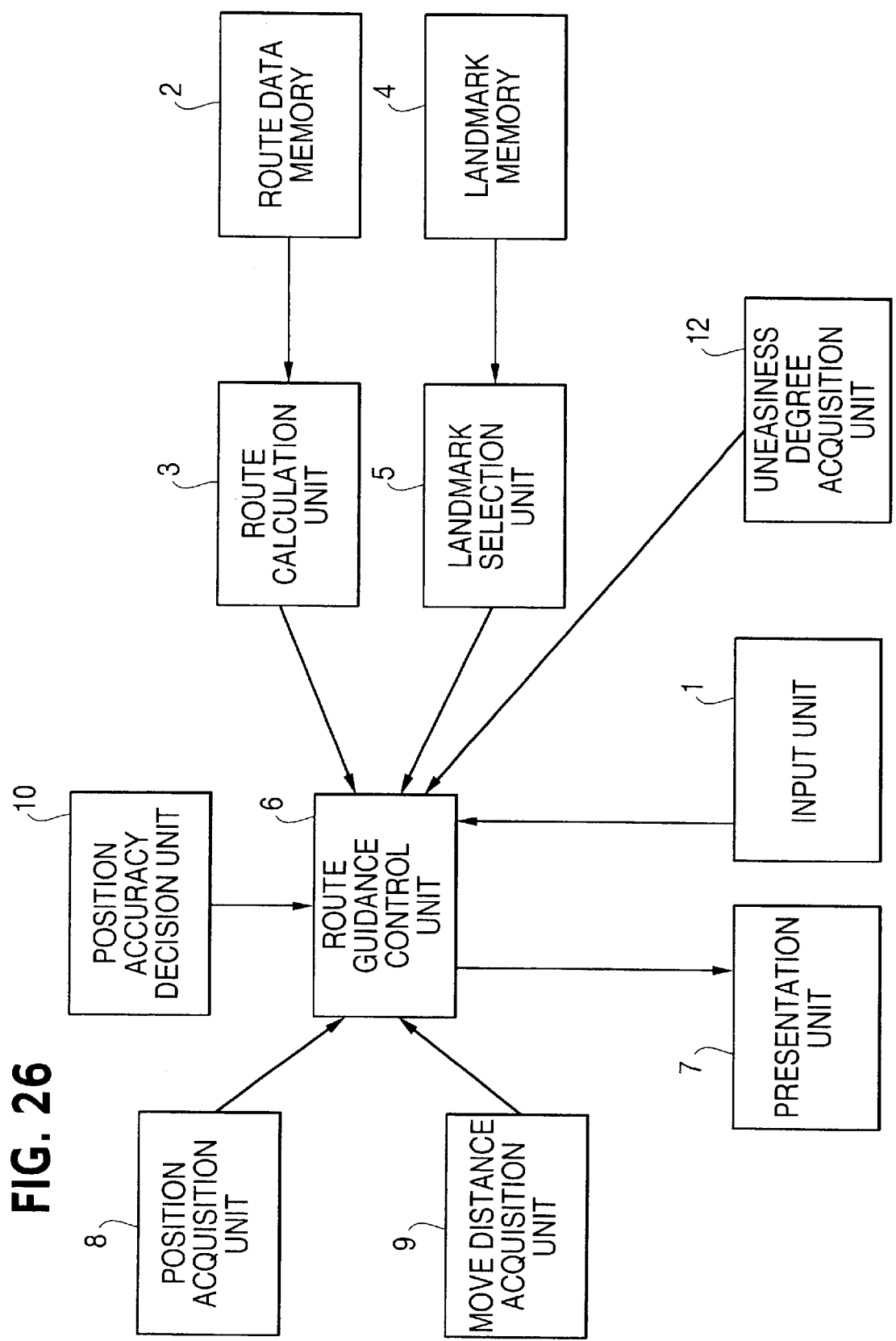
FIG. 26 is a block diagram of the route guidance system according to a fifth embodiment of the present invention.

Next, a fifth embodiment of the present invention is explained. In the fifth embodiment, in addition to the route guidance system of the third embodiment, the route guidance is executed by a condition such as the user's uneasiness. In the third embodiment, an interval distance to confirm the landmark is determined by the accuracy of position acquisition. However, even if the accuracy of position acquisition is high, if a guidance place is a first visit for the user, he often desires diligent guidance. Therefore, in the fifth embodiment, as shown in FIG. 26, an uneasiness degree acquisition unit 12 is added to the component of the route guidance system of the third embodiment. The uneasiness degree acquisition unit 12 detects a degree of the user's uneasiness condition and reports that the uneasiness degree is above a predetermined level to the route guidance control unit 6. As a means for acquiring the uneasiness degree, a method for using a living body sensor such as sweat sensor or a heartbeat sensor, a method for recognizing a mutter such as "Well." or "To be sure." uttered by the user, a method for monitoring a movement of the user's neck such as starting about by acceleration sensor, are selectively used.

Figure 27:
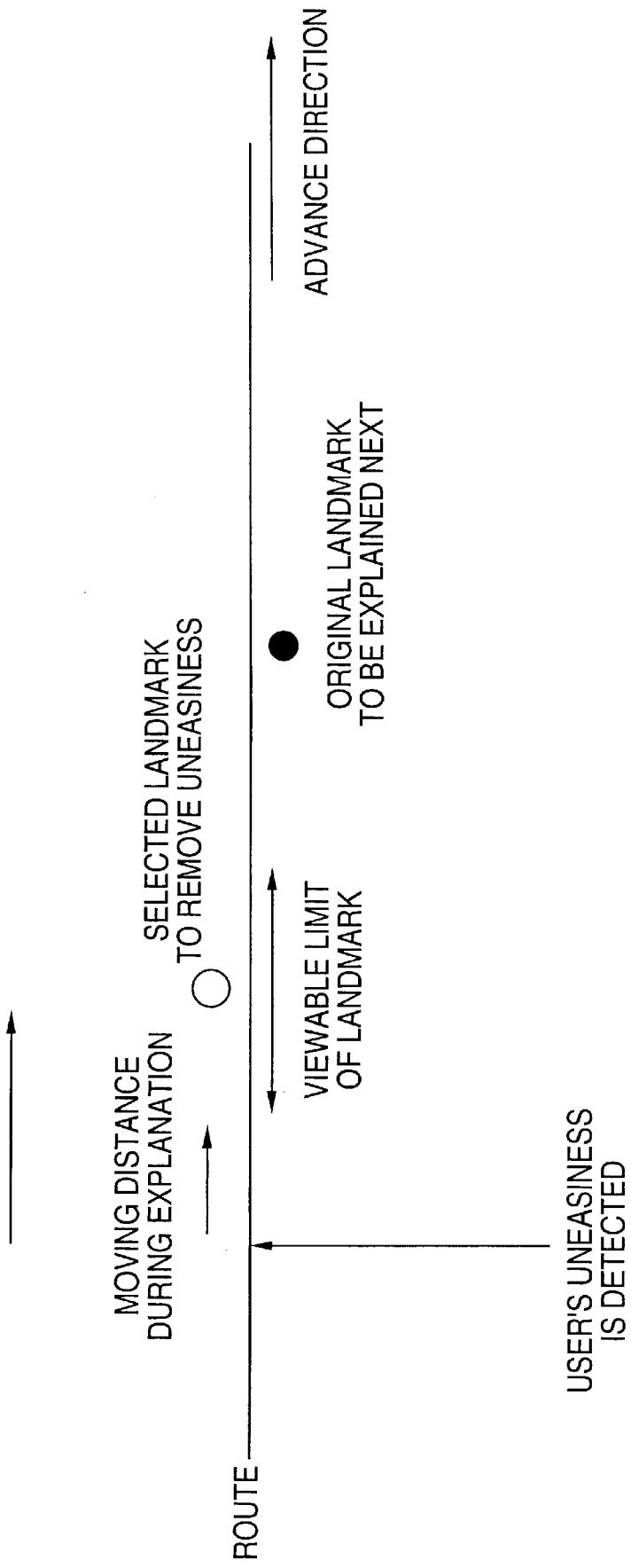
FIG. 27 is a schematic diagram of a time chart of the route guidance system according to the fifth embodiment.

By referring to FIG. 27, a method for executing the route guidance after detection of the user's uneasiness is explained. As mentioned-above in the third embodiment, while the operation to confirm the landmark is executed on the user's way, a confirmation of another landmark is activated by the user's uneasiness. In FIG. 27, as a landmark to be explained next, the landmark of a black circle is selected. In this case, if the uneasiness degree acquisition unit 12 informs that detection of the user's uneasiness to the route guidance control unit 6, the route guidance control unit 6 searches another landmark able to be explained at the earliest from the present time, selects the landmark of a white circle, and sets this landmark as a landmark to be explained next. Hereafter, the operation is executed in the same way as the third embodiment. When the user arrives at a point to start the explanation, the explanation of the landmark of white circle starts. Furthermore, in case of input of the destination, an item to input whether the user is familiar with the place may be added. In connection with this item, a set of the interval distance to confirm the landmark may be changed or the interval distance may be freely set as an option.

In this way, in the route guidance system of the fifth embodiment, by detecting the user's mental condition, necessary information is presented when the user desires the information. Therefore, the route guidance is executed so that the user's uneasiness is removed.

Figure 28:
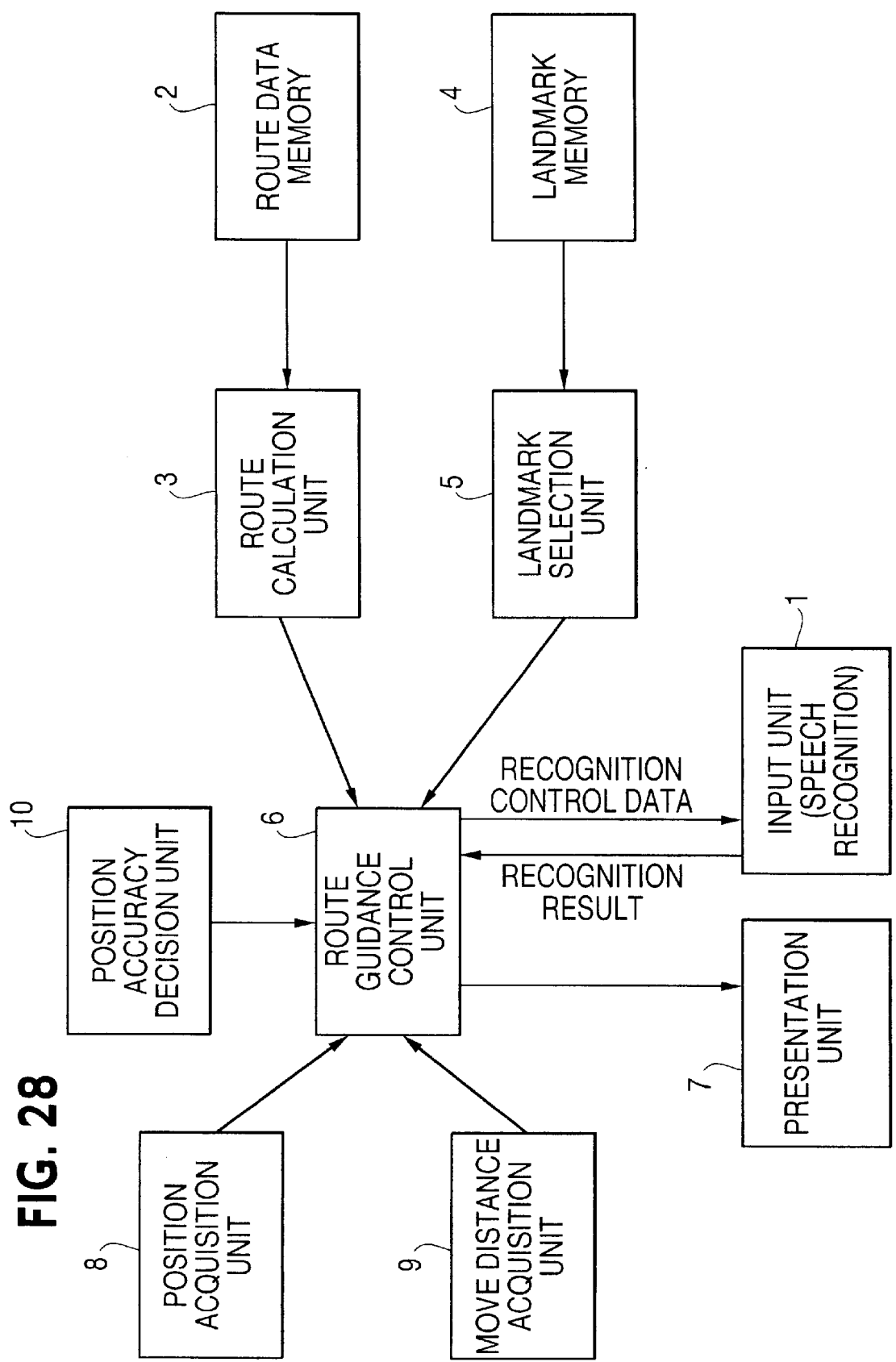
FIG. 28 is a block diagram of the route guidance system according to a sixth embodiment of the present invention.

Next, a sixth embodiment of the present invention is explained. FIG. 28 is a block diagram of the route guidance system according to the sixth embodiment. In the sixth embodiment, the input unit 1 of the third embodiment is regarded as a speech recognition means for recognizing speech vocabularies uttered by the user. The speech recognition means includes a dictionary for storing vocabularies as object of speech recognition, and it is necessary to previously indicate a candidate of vocabulary as recognition object. Especially, in a small portable terminal for the pedestrian, a high speed calculation apparatus is not used. As the speech recognition means to be used, an isolated word is regarded as the object and a number of candidates to be recognized at once is limited. Furthermore, in order to improve the recognition accuracy, it is move effective to minimize the number of candidates as much as possible if the number of candidates can be limited.

As mentioned-above in each embodiment, in a dialogue which the system presents the landmark and the user replies its existence recognition, a number of candidate vocabularies for the speech recognition means to be indicated is sufficiently few. However, in case that the user walks through a place, such as a residential neighborhood, where suitable landmarks do not exist or the user lose his way during walking, the system can not often indicate a suitable landmark. In this case, reversely, the user inputs a neighboring landmark or a mentioned address, and the system must confirm the user's present position to execute the route guidance. In order to cope with the user's input, if all of the possible landmarks and addresses on the route are registered as the candidate vocabulary of speech recognition object, the number of vocabularies is often too many. Therefore, the number of vocabularies must be limited by some method.

Figure 29:
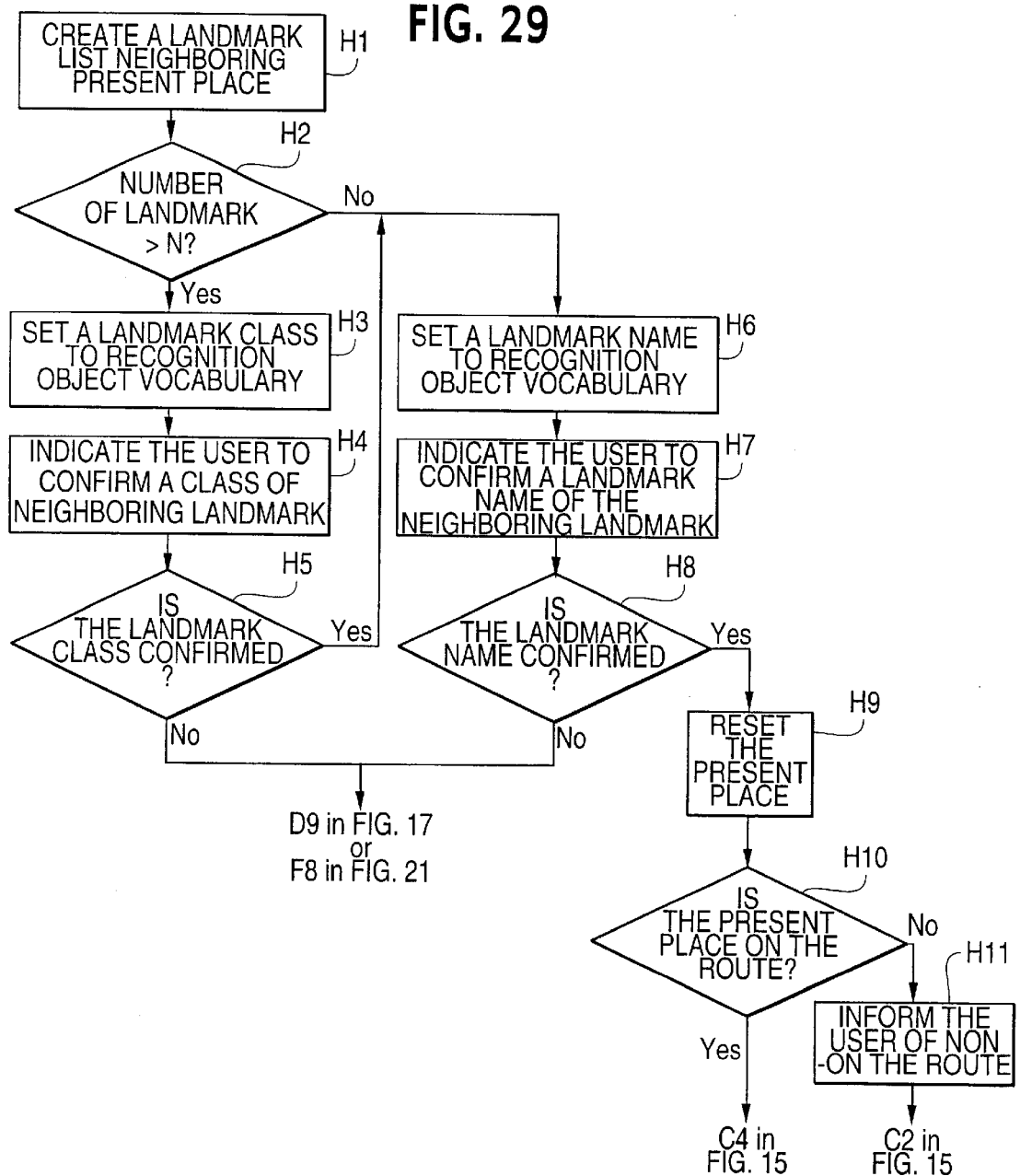
FIG. 29 is a flow chart of processing of the route guidance system according to the sixth embodiment.
Figure 30:
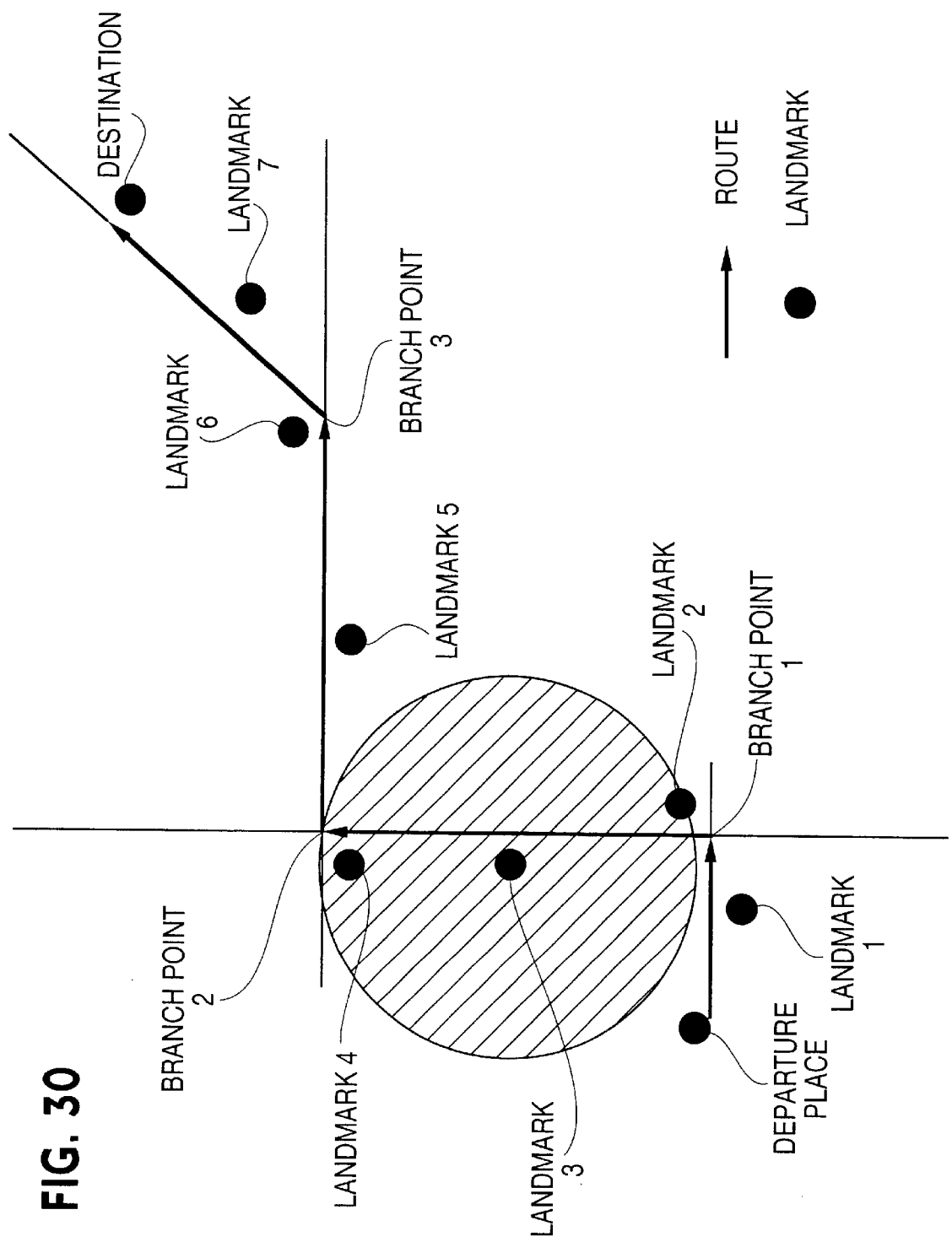
FIG. 30 is an example of the retrieval area in case of high accuracy of position acquisition according to the sixth embodiment.
Figure 31:
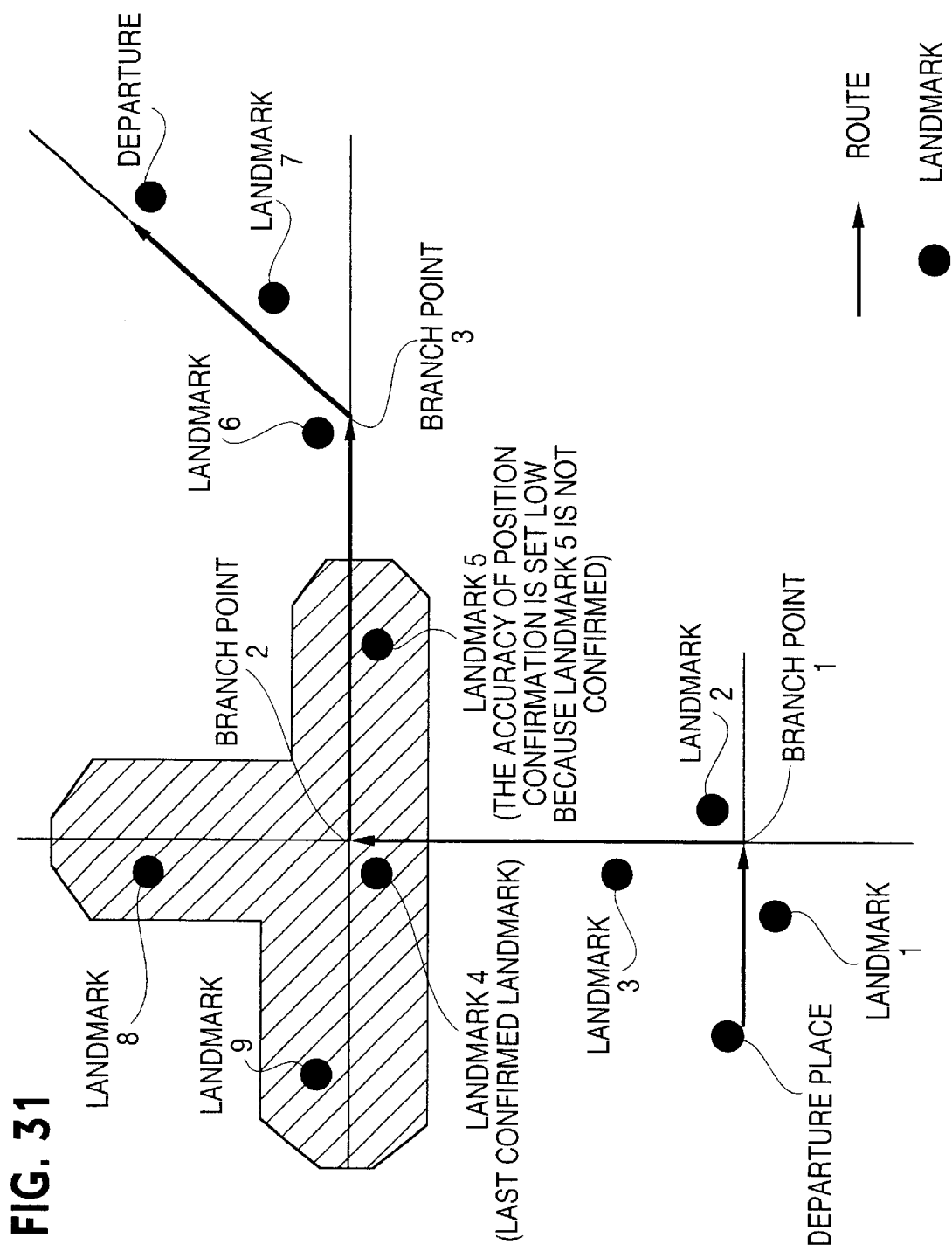
FIG. 31 is an example of the retrieval area in case of low accuracy of position acquisition according to the sixth embodiment.

FIG. 29 is a flow chart of processing of the route guidance control unit 6 in case the user inputs (teaches) the neighboring landmark information. When the system can not indicate a suitable landmark to the user at an important position for a route change such in between step D7 and step D9 in FIG. 17 and in between step F6 and step F8 in FIG. 21, or when it is doubtful whether the user is correctly walking because the user's confirmation is not obtained at step E8 in FIG. 19 and the accuracy of position confirmation calculated at step E9 is low, this flow chart in FIG. 29 is activated. First, a landmark neighboring the user's present location is retrieved from the landmark memory 4 (step H1). This retrieval area is controlled by the accuracy of position acquisition of the position acquisition unit 8 and the accuracy of position confirmation obtained from a dialogue with the user. If the accuracy of position acquisition is high, the landmark located in an area of maximum error of the position acquisition unit 8 is retrieved. FIG. 30 shows an example of retrieval area of the landmark if the user's landmark input is necessary at a place neighboring the landmark 3 and the accuracy of position acquisition is high. In FIG. 30, a circle area represented by an oblique line is the maximum error area of the position acquisition unit 6, and the names of the landmarks 2 and 4 are set as the candidate vocabulary. If the accuracy of position acquisition is low, the area is determined by the accuracy of position confirmation. The landmark in the movable area is determined by the user's moving distance from a position where the accuracy of position confirmation is lastly high through the dialogue to a present position. FIG. 31 shows an example of the retrieval area of landmarks if the accuracy of position acquisition was last high at landmark 4, if the user's landmark input is necessary at a place neighboring the landmark 5, and if the accuracy of position acquisition is low. In FIG. 31, an area represented by an oblique line is the retrieval area and represents a movable area based on a distance from the branch point 2 to the landmark 5. In this example, the names of the landmarks 8 and 9 are set as the candidate vocabulary. In FIG. 23, a building is mainly used as the landmark. However, by adding a street ward information to the landmark memory 4, the mentioned address may be added as the landmark.

Next, a processing is branched by the number of retrieved landmarks (step H2). Assume that a number of candidate vocabularies recognizable by the speech recognition means at real time and sufficient accuracy is Nmax and a number of vocabularies necessary for basic dialogue of route guidance such as "Yes." "No." is Nmin. At step H2 in FIG. 29, "N" is equal to "Nmax—Nmin". If the number of landmarks is above N, it is difficult to directly input the landmark name by the speech recognition. Therefore, candidate vocabularies must be limited. In this case, classes of retrieved landmarks are examined, and the classes are first set as the recognition candidate vocabulary of the speech recognition means (step H3). Then, the system instructs the user to search his neighboring landmark and to input the class of his searched landmark by speech (step H4). In this way, the system obtains the class of the landmark as the recognition result.

For example, as shown in FIG. 32, a question "Is there a convenience store, a bank, or a laundry neighboring you ?" is output to the user by speech synthesis, and a reply Laundry." is obtained by the user's speech. If the landmarks of classes set as the recognition candidate vocabularies are not located neighboring the user and the class of the landmark is not confirmed by user (No at step H5), the operation is moved to step D9 in FIG. 17 or step F8 in FIG. 21, and the route guidance is interrupted. On the other hand, if the class of the landmark is confirmed (Yes at step H5), the operation is moved to step H6. If the number of landmarks is not above N at step H2, or if the class of the landmark is confirmed at step H5, the operation is moved to a processing for the user to confirm the landmark.

In case of moving from step H2, a name list of the landmarks retrieved at step H1 is set as the recognition candidate vocabulary of the speech recognition means. In case of moving from step H5, landmarks belonging to the class indicated by the user are selected, and a name list of the landmarks is set as the recognition candidate vocabulary of the speech recognition means (step H6).

Next, the system instructs the user to search his neighboring landmark and to input the landmark name by speech input (step H7). In this way, the system obtains the landmark name as the recognition result. For example, as shown in FIG. 32, a question "What is the laundry's name ?" is output to the user by speech synthesis and the user's reply "ABC laundry." is obtained by speech. If the landmark name is not confirmed by the user (No at step H8), the operation is moved to step D9 in FIG. 17 or step F8 in FIG. 21, and the route guidance is interrupted. Alternatively, the operation is moved to step H3. In this case, the system instructs the user to search for another class of neighboring landmark and to confirm a landmark name belonging to the another class again. If this landmark name is confirmed (Yes at step H8), the operation is moved to step H9. In this case, the system instructs the user to move to the landmark position and sets the user's present place to the landmark position (step H9). If the present position is located on the route calculated at step C2 in FIG. 15, the operation is moved to step C4 in FIG. 15, and the route guidance is continually executed by the flow chart in FIG. 15. On the other hand, if the present position is not located on the route calculated by step C2 in FIG. 15, the operation is moved to step H11 in FIG. 29 (step H10). In this case, the system informs that the route is mistaken to the user, and the operation is moved to step C2 in FIG. 15. Then, the present position is set as a new departure point, the route is retrieved again by the new departure point, and the route guidance is reexecuted (step H11). In this case, the explanation of where the route was mistaken and what the user had to do may be presented to the user. In this way, the same mistake is prevented from occuring again.

In the sixth embodiment, if the number of landmarks is many, the class of the landmark is first confirmed in order to limit the landmark names as the recognition candidates. However, only landmarks located on the route may be first confirmed as the recognition candidate, and the retrieval area of the landmark may be gradually expanded to the circumference.

As mentioned-above, even if the system can not indicate a suitable landmark to the user, the user reversely indicates his neighboring landmark to the system, and the route guidance is smoothly executed. Furthermore, as for the speech recognition means to previously set the recognition candidate vocabulary, the speech input is possible while a suitable recognition candidate vocabulary is always indicated.

Figures 33A, 33B:
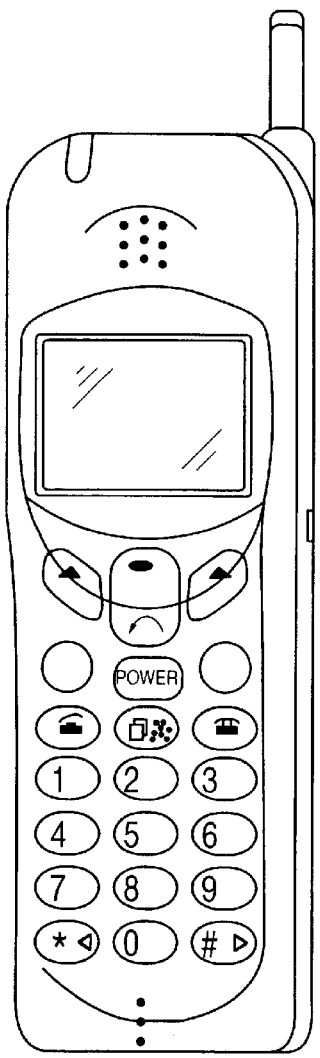
FIG. 33A is a schematic diagram of an input unit according to a modification of the sixth embodiment.
FIG. 33B shows an example of a display screen of the input unit shown in FIG. 33A.

In the sixth embodiment, in case that the input unit 1 is the speech recognition means, a method for limiting the number of recognition candidates is explained. However, this method is applied to a menu selection means of a portable telephone (cellular phone) as shown in FIG. 33A. In this case, a plurality of selection items are displayed on a screen of the portable telephone as shown in FIG. 33B and the user selectively indicates a class of the landmark by pushing a corresponding operation button. In short, if the number of landmarks to be confirmed is above a number of items displayable on the screen, classes of the landmarks are first displayed as a list in order to limit the number of landmarks. If the user selects one class by pushing the operation button, landmark names belonging to the one class are then displayed as a list. Therefore, as for the menu selection means in which a number of displayable items is limited, the user can selectively indicate one candidate while suitable candidates are always displayed as a list.

As mentioned-above, in the present invention, the landmark confirmable by the pedestrian is used as the route guidance. Especially, the landmark confirmable by the pedestrian at actual walk time is used as the route guidance. Accordingly, it is possible to suitably guide the pedestrian from the departure place to the destination.

Furthermore, a method for presenting the route guidance is controlled by the user's present position, the accuracy of position acquisition, and a response from the user. Accordingly, for example, troublesome confirmation work more than necessary is not forced on the user. In short, a suitable route guidance to minimize the user's burden is realized.

Furthermore, even if the system side can not indicate a suitable landmark to the user or the user loses his way, landmark information neighboring the user is indicated to the system side. Accordingly, the route guidance is realized while the user's present position is always confirmed.

A memory can be used to store instructions for performing the process described above. The process may be performed with the aid of a general purpose computer or microprocessor. Such a memory can thus be a CD-ROM, floppy disk, hard disk, magnetic tape, semiconductor memory, and so on.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A route guidance system for a pedestrian, comprising:
    an input unit configured to input a departure point and a destination point of a pedestrian user;
    a route data memory configured to store route data including path positions and connections of a road network;
    a route calculation unit configured to calculate a route from the departure point to the destination point by referring to the route data in said route data memory;

a landmark memory configured to store landmark data for the pedestrian's confirmation, each landmark representing a signpost of one of the departure point, the destination point, and the route;

a landmark selection unit configured to select the landmark data along the route calculated by said route calculation unit from said landmark memory; and a presentation unit configured to present a route guidance to the pedestrian using the route calculated by said route calculation unit and the landmark data selected by said landmark selection unit, and to indicate to the pedestrian to confirm the landmark in the route guidance whenever said presentation unit presents each landmark along the route;

wherein said input unit inputs a response including a confirmation by the pedestrian for each landmark presented by said presentation unit.

2. The route guidance system according to claim 1, wherein the landmark data comprises a landmark ID, a name, a class, a position of each landmark, and a pedestrian aptitude of each class, the pedestrian aptitude is evaluation to confirm the landmark belonging to the class.

3. The route guidance system according to claim 1, wherein said input unit determines the present time, wherein said landmark memory stores an aptitude time of each landmark, the aptitude time is a time segment for the pedestrian to confirm the landmark, and wherein said landmark selection unit selects the landmark data whose aptitude time coincides with the present time.

4. The route guidance system according to claim 1, wherein said presentation unit outputs the selected landmark positioned along the route on a map through a portable display, or interactively outputs speech to lead the user to the destination through a headphone.

5. The route guidance system according to claim 1, whenever said presentation unit presents each landmark along the route until the pedestrian's arriving at the destination point, wherein said input unit inputs the response including the confirmation by the pedestrian for each landmark in order.

6. The route guidance system according to claim 5, further comprising:

a position acquisition unit configured to acquire a present position of the pedestrian, an accuracy of position acquisition being predetermined;

a position accuracy decision unit configured to determine an accuracy of position confirmation between the present position and actual position by referring to a response of the pedestrian; and a route guidance control unit configured to control the presentation method of the route guidance according to the accuracy of position acquisition and the accuracy of position confirmation.

7. The route guidance system according to claim 6, wherein said route guidance control unit changes a presentation timing of the route guidance to the user according to the accuracy of position acquisition of said position acquisition unit.

8. The route guidance system according to claim 6, wherein said route guidance control unit changes an explanation mode representing whether the confirmation of the user is necessary according to the accuracy of position confirmation determined by said position accuracy decision unit.

9. The route guidance system according to claim 6, wherein, if the present position is not the destination, said presentation unit presents a landmark for confirming an advance direction, and, if the confirmation for the landmark is input from said input unit, said presentation unit instructs the pedestrian to walk along the advance direction.

10. The route guidance system according to claim 6, wherein said landmark memory stores a viewable distance of daytime and nighttime of the pedestrian for each landmark, and further comprising a move distance acquisition unit configured to acquire a distance the user walks.

11. The route guidance system according to claim 10, wherein said route guidance control unit determines a start point to present a next landmark according to the distance traveled by the user, the position and the viewable distance of the next landmark, and wherein said presentation unit presents the next landmark when the present position of the user coincides with the start point.

12. The route guidance control system according to claim 11, wherein, if the next landmark is used for a branch point and the confirmation of the next landmark is input from said input unit, said presentation unit instructs the user to turn in a predetermined direction at the branch point.

13. The route guidance control system according to claim 10, wherein said landmark memory additionally stores a confirmation level representing one of name, class, and number of stories as confirmable data of each landmark, and wherein, if the confirmation level of the landmark to be presented is already stored in said landmark memory, said presentation unit presents the landmark representing the confirmation level to the user.

14. The route guidance control system according to claim 13, wherein, if the confirmation level of the landmark is not stored in said landmark memory, said presentation unit presents the landmark in order of the number of stories, the class, the name, and urges the user to input whether the landmark is confirmed whenever each confirmation level of the landmark is presented.

15. The route guidance control system according to claim 14, further comprising a landmark information editing unit configured to set the confirmation level of higher order if the landmark is confirmed by the user to said landmark memory.

16. The route guidance control system according to claim 10, further comprising an uneasiness degree acquisition unit configured to detect whether the user is uneasy, and wherein, when said uneasiness degree acquisition unit detects that the user is uneasy, said presentation unit presents a landmark neighboring the present position of the user to remove the uneasiness.

17. The route guidance control system according to claim 6, wherein said input unit is a speech recognition unit to recognize a number of the user's words, and wherein, if a maximum number of recognizable words is N, said route guidance control unit registers landmark names neighboring the present position of the user whose number is below N as recognition object vocabularies of the speech recognition unit in order for the user to speak the neighboring landmark name.

18. The route guidance control system according to claim 17, wherein, if the number of landmark names neighboring the present position of the user is above N, said route guidance control unit first registers classes of the landmark names as the recognition object vocabularies of the speech recognition unit, and, if one class is selected by the user's speech through the speech recognition unit, registers landmark names belonging to the one class as the recognition object words of the speech recognition unit.

19. The route guidance control system according to claim 17, wherein, if one landmark name selected by the user's speech is not on the route calculated by said route calculation unit, said route calculation unit calculates a new route based on the one landmark as a departure place in order to present the route guidance again.

20. The route guidance control system according to claim 6, wherein said input unit is a menu selection unit for the user to select from a plurality of selection items on a display, and wherein, if a number of displayable selection items is N, said route guidance control unit registers landmark names neighboring the present position of the user whose number is below N as display object selection items of the menu selection unit in order for the user to select the neighboring landmark.

21. The route guidance control system according to claim 20, wherein, if the number of landmark names neighboring the present position of the user is above N, said route guidance control unit first registers classes of the landmark names as the display object selection items of the menu selection unit, and if one class is selected by the user through the menu selection unit, registers landmark names belonging to the one class as the display object selection items of the menu selection unit.

22. The route guidance control system according to claim 20, wherein, if one landmark name selected by the user is not on the route calculated by said route calculation unit, said route calculation unit calculates a new route based on the one landmark as a departure place in order to present the route guidance again.

23. A route guidance system for a pedestrian, comprising:

a receiver configured to receive data representing a departure point and a destination point transmitted from a portable terminal;

a route data memory configured to store route data including path positions and connections of a road network;

a route calculation unit configured to calculate a route from the departure point to the destination point by referring to the route data in said route data memory;

a landmark memory configured to store landmark data for the pedestrian's confirmation, each landmark representing a signpost of one of the departure point, the destination point, and the route;

a landmark selection unit configured to select the landmark data along the route calculated by said route calculation unit from said landmark memory; and a transmitter configured to transmit route guidance data using the route calculated by said route calculation unit and the landmark data selected by said landmark selection unit to the portable terminal, and to transmit an indication for the pedestrian to confirm each landmark in the route guidance data to the portable terminal;

wherein said receiver receives a response including a confirmation for each landmark from the portable terminal.

24. A route guidance method for a pedestrian, comprising:

inputting a departure point and a destination point of a pedestrian user;

calculating a route from the departure point to the destination point by referring to prestored route data, the route data including path positions and connections of a road network;

selecting landmark data along the calculated route from restored landmark data for the pedestrian's confirmation, each landmark representing a signpost of one of the departure point, the destination point, and the route;

presenting a route guidance to the pedestrian using the calculated route and the selected landmark data;

requiring the pedestrian to confirm the landmark in the route guidance whenever each landmark is presented along the route; and inputting a response including a confirmation by the pedestrian for each presented landmark.

25. A computer readable memory containing computer readable instructions, comprising:

an instruction unit for causing a computer to input a departure point and a destination point of a pedestrian;

an instruction unit for causing a computer to calculate a route from the departure point to the destination point by referring to prestored route data, the route data including path positions and connections of a road network;

an instruction unit for causing a computer to select landmark data along the calculated route from prestored landmark data for the pedestrian's confirmation, each landmark representing a signpost of one of the departure point, the destination point, and the route;

an instruction unit for causing a computer to present a route guidance to the pedestrian using the calculated route and the selected landmark data;

an instruction unit for causing a computer to indicate to the pedestrian to confirm the landmark in the route guidance whenever each landmark is presented along the route; and an instruction unit for causing a computer to input a response including a confirmation by the pedestrian for each presented landmark.

26. A route guidance system for a pedestrian, comprising:
- an input unit configured to input a departure point, a destination point, and the present time as the pedestrian's actual walk time;
- a route data memory configured to store route data including path positions and connections of a road network;
- a route calculation unit configured to calculate a route from the departure point to the destination point by referring to the route data in said route data memory;
- a landmark memory configured to store landmark data for the pedestrian's confirmation, each landmark representing a signpost of one of the departure place, the destination point, and the route, the landmark data including an aptitude time of each landmark, the aptitude time is a time segment for the pedestrian to confirm the landmark;
- a landmark selection unit configured to select the landmark data along the route calculated by said route calculation unit from said landmark memory, the aptitude time of the landmark data selected coincide with the present time; and
- a presentation unit configured to present a route guidance to the pedestrian using the route calculated by said route calculation unit and the landmark data selected by said landmark selection unit.

27. A route guidance system for a pedestrian, comprising:
- a receiver configured to receive data representing a departure point, a destination point, and the present time as the pedestrian's actual walk time, transmitted from a portable terminal;
- a route data memory configured to store route data including path positions and connections of a road network;
- a route calculation unit configured to calculate a route from the departure point to the destination point by referring to the route data in said route data memory;
- a landmark memory configured to store landmark data for the pedestrian's confirmation, each landmark representing a signpost of one of the departure point, the destination point, and the route, the landmark data including an aptitude time of each landmark, the aptitude time is a time segment for the pedestrian to confirm the landmark;
- a landmark selection unit configured to select the landmark data along the route calculated by said route calculation unit from said landmark memory, the aptitude time of the landmark data selected coincides with the present time; and
- a transmitter configured to transmit route guidance data using the route calculated by said route calculation unit and the landmark data selected by said landmark selection unit to the portable terminal.

28. A route guidance method for a pedestrian, comprising:
- inputting a departure point, a destination point, and the present time as the pedestrian's actual walk time;
- calculating a route from the departure point to the destination point by referring to prestored route data, the route data including path positions and connections of a road network;
- selecting landmark data along the calculated route from prestored landmark data for the pedestrian's confirmation, each landmark representing a signpost of one of the departure point, the destination point, and the route the landmark data including an aptitude time of each landmark, the aptitude time is a time segment for the pedestrian to confirm the landmark, the aptitude time of selected landmark data coincides with the present time; and
- presenting a route guidance to the pedestrian using the calculated route and the selected landmark data.

29. A computer readable memory containing computer readable instructions, comprising:
- an instruction unit for causing a computer to input a departure point, a destination point, and the present time as the pedestrian's actual walk time;
- an instruction unit for causing a computer to calculate a route from the departure point to the destination point by referring to prestored route data, the route data including path positions and connections of a road network;
- an instruction unit for causing a computer to select landmark data along the calculated route from prestored landmark data for the pedestrian's confirmation, each landmark representing a signpost of one of the departure point, the destination point, and the route, the landmark data including an aptitude time of each landmark, the aptitude time is a time segment for the pedestrian to confirm the landmark, the aptitude time of selected landmark data coincides with the present time; and
- an instruction unit for causing a computer to present a route guidance to the pedestrian using the calculated route and the selected landmark data.

* * * * *